United States Patent
Ellefson et al.

(10) Patent No.: US 9,340,368 B2
(45) Date of Patent: May 17, 2016

(54) APPARATUS AND METHOD FOR ORIENTING A BEVERAGE CONTAINER END CLOSURE AND APPLYING INDICIA IN A PREDETERMINED LOCATION

(71) Applicant: Ball Corporation, Broomfield, CO (US)

(72) Inventors: Dean C. Ellefson, Arvada, CO (US); Gregg Coningsby, Fort Lauderdale, FL (US); Edward D. Archer, Sebring, FL (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 14/844,789

(22) Filed: Sep. 3, 2015

(65) Prior Publication Data

US 2015/0375943 A1 Dec. 31, 2015

Related U.S. Application Data

(63) Continuation-in-part of application No. 14/332,618, filed on Jul. 16, 2014.

(60) Provisional application No. 61/859,115, filed on Jul. 26, 2013.

(51) Int. Cl.
| | |
|---|---|
| *B41F 17/00* | (2006.01) |
| *B65G 47/244* | (2006.01) |
| *B65G 49/00* | (2006.01) |
| *B41F 17/16* | (2006.01) |

(Continued)

(52) U.S. Cl.
CPC .............. *B65G 47/244* (2013.01); *B41F 17/006* (2013.01); *B41F 17/16* (2013.01); *B65G 47/24* (2013.01); *B65G 49/00* (2013.01); *B21D 51/44* (2013.01); *B65D 17/165* (2013.01); *B65D 2203/00* (2013.01); *B65G 47/841* (2013.01)

(58) Field of Classification Search
CPC ........ B41F 17/00; B41F 17/006; B41F 17/28; B65G 47/24; B65G 47/244; B65G 49/00; B21D 51/38; B21D 51/383; B21D 51/44; G09F 23/0091; B65D 17/165; B65D 2203/00
See application file for complete search history.

(56) References Cited

U.S. PATENT DOCUMENTS

| | | | |
|---|---|---|---|
| 1,257,710 | A | 2/1918 | Januchowsky |
| 1,878,541 | A | 9/1932 | Reinhold |

(Continued)

FOREIGN PATENT DOCUMENTS

| | | |
|---|---|---|
| GB | 2428659 | 2/2007 |
| GB | 2428668 | 2/2007 |

(Continued)

OTHER PUBLICATIONS

"Crona Treatment," Wikipedia, last modified Feb. 7, 2014, 4 pages [retrieved from: http://en.wikipedia.org/w/index.php?title=Corona_treatment&oldid=594301353].

(Continued)

*Primary Examiner* — Blake A Tankersley
(74) *Attorney, Agent, or Firm* — Sheridan Ross P.C.

(57) ABSTRACT

An apparatus and method of orienting and decorating container end closures is provided. More specifically, the present invention relates to apparatus and methods used to position container end closures in a predetermined orientation and then decorate a predetermined portion of the end closures.

20 Claims, 14 Drawing Sheets

(51) Int. Cl.
*B65G 47/24* (2006.01)
*B21D 51/44* (2006.01)
*B65D 17/00* (2006.01)
*B65G 47/84* (2006.01)

(56) References Cited

U.S. PATENT DOCUMENTS

| | | | |
|---|---|---|---|
| 2,764,933 | A | 10/1956 | Hargrave |
| 3,580,380 | A * | 5/1971 | Phillips ................ B65G 47/244 198/376 |
| 3,628,650 | A * | 12/1971 | Rouse ................ B21D 51/383 198/394 |
| 4,016,968 | A | 4/1977 | Stelter |
| 4,203,240 | A | 5/1980 | Goodwin |
| 5,233,922 | A | 8/1993 | Stirbis et al. |
| D365,021 | S | 12/1995 | Park |
| 5,492,077 | A | 2/1996 | Rose |
| D379,065 | S | 5/1997 | Dotson |
| 5,893,286 | A | 4/1999 | Johnson et al. |
| 5,992,892 | A | 11/1999 | Schaefer et al. |
| 6,053,349 | A | 4/2000 | Griggs, Jr. et al. |
| 6,105,806 | A | 8/2000 | Stasiuk |
| 6,244,456 | B1 | 6/2001 | Hanlon |
| 6,382,440 | B1 | 5/2002 | Brant et al. |
| 6,524,048 | B1 | 2/2003 | Tsukada et al. |
| 6,533,518 | B1 | 3/2003 | Turner et al. |
| 6,634,516 | B2 | 10/2003 | Carballido |
| 6,659,833 | B1 | 12/2003 | Sloot |
| 6,706,995 | B2 | 3/2004 | Miller et al. |
| 6,808,351 | B1 | 10/2004 | Brown et al. |
| 6,868,627 | B2 | 3/2005 | Elias |
| 6,877,607 | B2 | 4/2005 | Jenkins |
| 7,108,469 | B2 | 9/2006 | Jenkins |
| 7,914,640 | B2 | 3/2011 | Ronnberg |
| 2003/0192211 | A1 | 10/2003 | Elias |
| 2004/0123444 | A1 | 7/2004 | Lee |
| 2005/0045637 | A1 | 3/2005 | Rohr et al. |
| 2005/0082299 | A1 | 4/2005 | Jenkins |
| 2006/0140746 | A1 | 6/2006 | Koon |
| 2008/0110888 | A1 | 5/2008 | Turner et al. |
| 2010/0058896 | A1 | 3/2010 | Abel et al. |
| 2011/0050346 | A1 | 3/2011 | Schroth et al. |
| 2011/0084051 | A1 | 4/2011 | Reed et al. |
| 2011/0100854 | A1 | 5/2011 | Chapin |
| 2011/0115815 | A1 | 5/2011 | Xu et al. |
| 2011/0226636 | A1 | 9/2011 | Petti |
| 2011/0226719 | A1 | 9/2011 | Park |
| 2012/0137837 | A1 | 6/2012 | Souma |
| 2013/0075296 | A1 | 3/2013 | Ramsey et al. |
| 2014/0360394 | A1 | 12/2014 | Carreras |
| 2015/0027327 | A1 | 1/2015 | Ellefson |
| 2015/0217559 | A1 | 8/2015 | Carreras et al. |

FOREIGN PATENT DOCUMENTS

| | | |
|---|---|---|
| WO | WO 99/09853 | 3/1999 |
| WO | WO 00/47487 | 8/2000 |
| WO | WO 2007/007102 | 1/2007 |
| WO | WO 2011/050346 | 4/2011 |
| WO | WO 2011/115815 | 9/2011 |
| WO | WO 2013/049313 | 4/2013 |
| WO | WO 2013/049320 | 4/2013 |
| WO | WO 2014/008544 | 1/2014 |
| WO | WO 2014/072455 | 5/2014 |

OTHER PUBLICATIONS

"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].

"Powerbuilt Hand & Specialty Tools" 2011-2012 catalog, Powerbuilt, Jul. 2011, 124 pages.

"UV LED Curing," Wikipedia, last modified May 24, 2014, 3 pages [retrieved from http://en.wikipedia.org/w/index.php?title=UV_LED_Curing&oldid=609977029].

International Search Report and Written Opinion for International (PCT) Patent Application No. PCT/US2014/046868, mailed Jan. 2, 2015, 10 pages.

Official Action for U.S. Appl. No. 14/332,618, mailed Apr. 1, 2015, 11 pages.

Final Action for U.S. Appl. No. 14/332,618, mailed Jul. 29, 2015, 16 pages.

Notice of Allowance for U.S. Appl. No. 14/332,618, mailed Nov. 5, 2015, 5 pages.

* cited by examiner

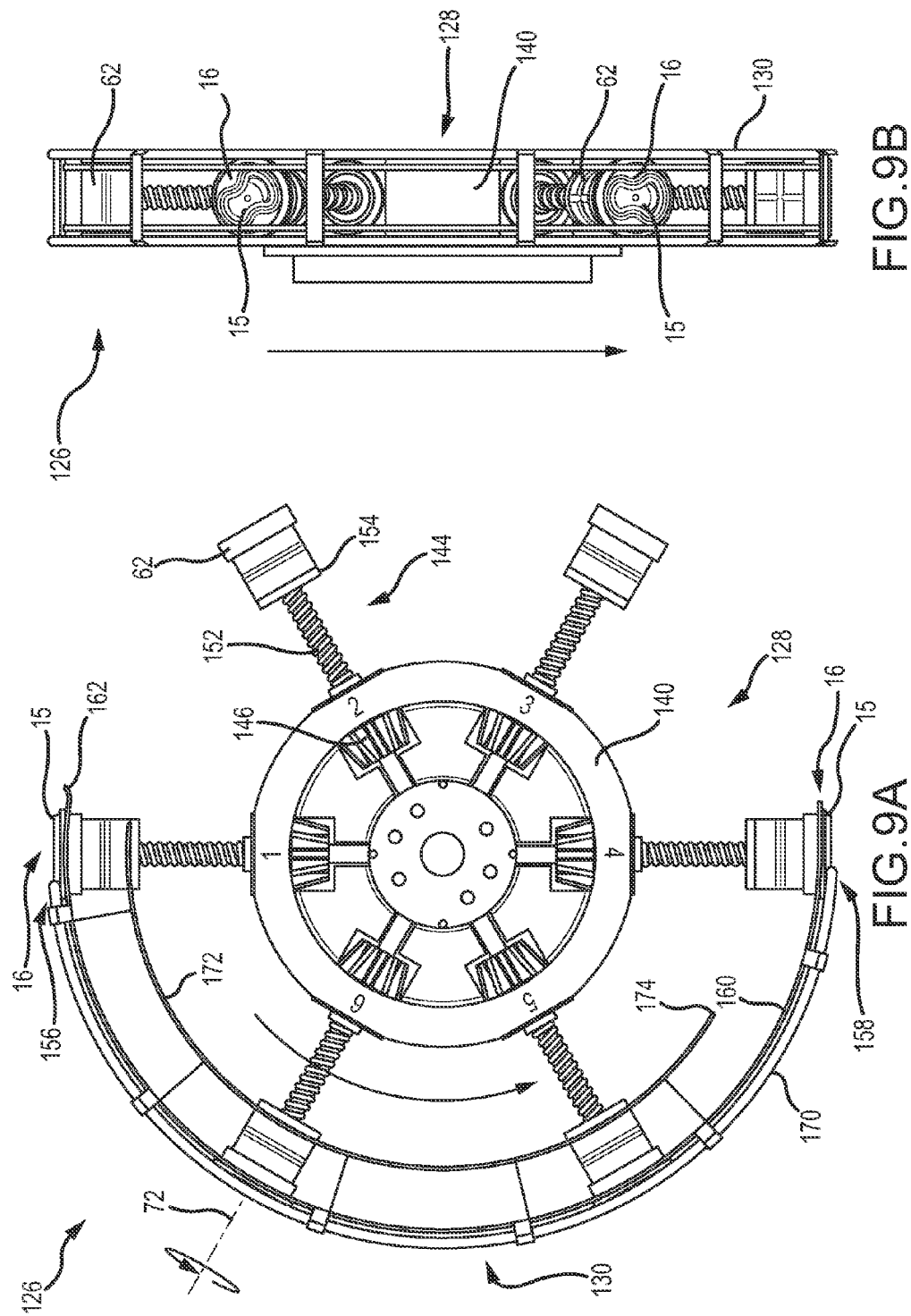

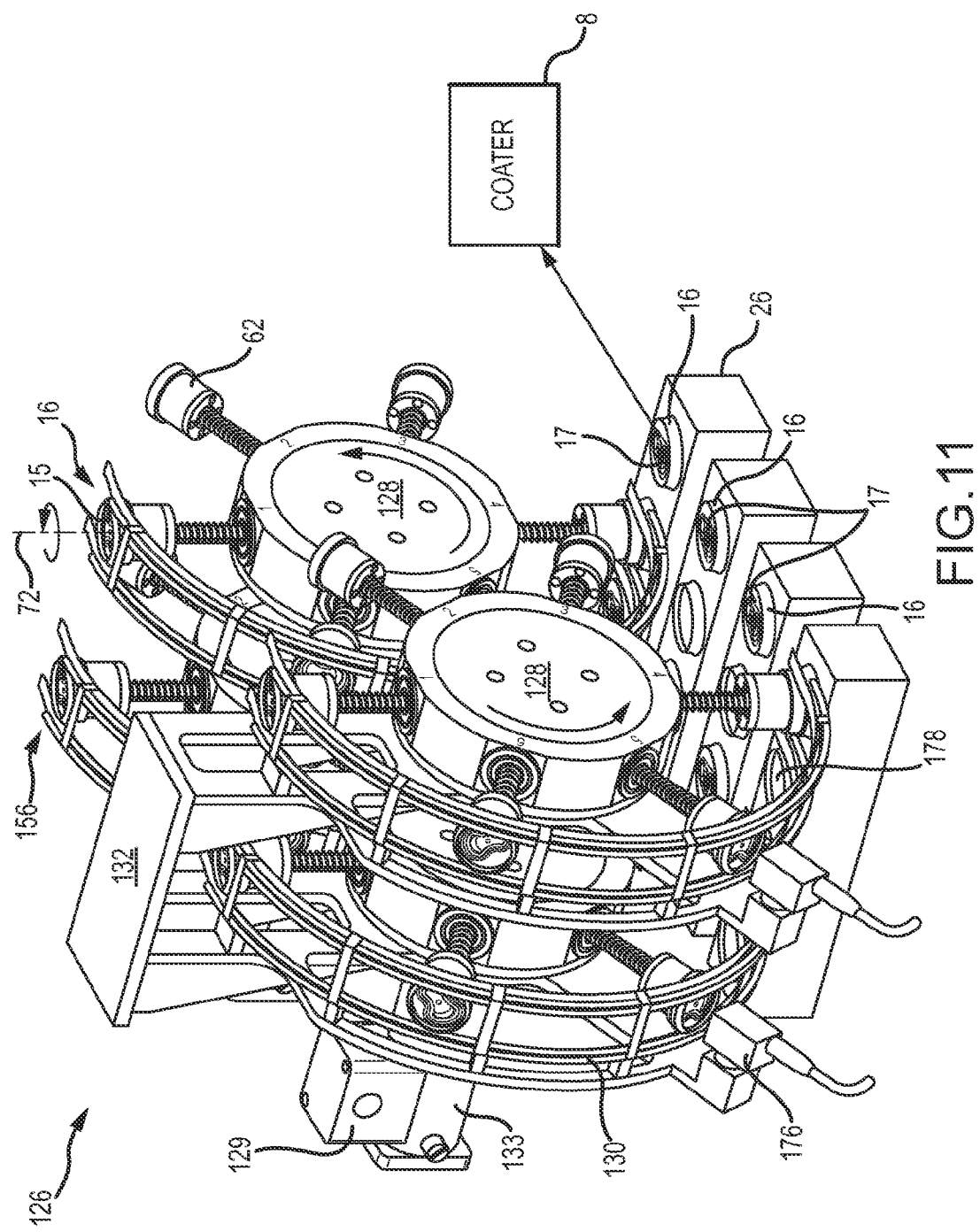

APPARATUS AND METHOD FOR ORIENTING A BEVERAGE CONTAINER END CLOSURE AND APPLYING INDICIA IN A PREDETERMINED LOCATION

CROSS-REFERENCE TO RELATED PUBLICATIONS

This application is a Continuation-In-Part application and claims the benefit and priority of U.S. application Ser. No. 14/332,618, filed Jul. 16, 2014, which claims priority under 35 U.S.C. §119(e) to U.S. Provisional Application Ser. No. 61/859,115, filed Jul. 26, 2013, which are each incorporated herein in their entirety by reference.

FIELD OF THE INVENTION

The present invention relates generally to the manufacture of container end closures. More specifically, the present invention relates to methods and apparatus for orienting and registering a plurality of container end closures at high speed and providing printed indicia on predetermined portions of each end closure.

BACKGROUND

The global beverage industry, including soft drinks, beers, ciders, spirits and wines, was valued at $1.4 trillion in 2008. The industry includes roughly 1,500 soft drink brands and about 20,000 beer brands. Many of these brands package their beverages in metallic beverage containers. As a result, approximately 80 billion metallic beverage containers are used every year globally.

Metallic beverage containers offer bottlers, distributors, and retailers an ability to stand out at the point of sale because metal beverage containers provide ideal surfaces to decorate with brand names, logos, designs, product information, and/or other preferred indicia for identifying, marketing, and distinguishing the beverage container and its contents from other products and competitors. Currently the container body is the primary surface of a beverage container that is decorated. However, container bodies and the decorations thereon are frequently obstructed during consumption of a beverage by the consumer's hand. Further, the alignment between decorations on the container body and the pour opening of the container end closure is random and therefore the decoration may be positioned away from the consumer during consumption.

Metal end closures provide a unique and effective surface for decorating with advertising and marketing indicia in new and creative ways. Unlike the container body, consumers naturally align the end closure to open and drink from the container. Thus, the end closure is positioned to be viewed by the consumer. Further, the end closure is typically not obstructed or blocked during consumption of the beverage. However, end closures are frequently left undecorated because there are several disadvantages with the known methods of decorating them. Therefore, container end closures provide an underutilized opportunity for differentiating products at the point of sale and for attracting consumers.

Container end closures, or shells, are formed separately from the container body. The manufacture of end closures requires a number of processing steps collectively referred to as a conversion process and is generally illustrated and described in "How Ball Makes Beverage Ends," available at http://www.ball.com/images/ball_com/product_options_files/How_Ball_Makes_Beverage_Ends.pdf (last visited Jun. 13, 2014) and U.S. Pat. No. 6,533,518, which are each incorporated herein by reference in their entirety. During the conversion process, the end closures are transported to a number of processing stations. Typically, a shell press punches out circular blanks from a roll or coil of a metal material and forms the blanks into shells. A curler forms a peripheral curl around a circumference of the shells and forms a countersink in the shells. Liners apply sealing compounds to the shells. A conversion press then converts the shells into end closures. The orientation of the shells entering the conversion press is random because there is no need, or reliable method, for orienting the shells in the current conversion process. The conversion press contains multiple progressive die sets which raise a rivet in the center of the shell, forms severable scores to define a tear panel and a pour opening, and connects a pull tab to the rivet. The end closures are then bagged, palletized, and stored until needed to seal a filled container body.

Current manufacturing methods limit the types and locations of decorations that can be applied to the end closures. One known method of decorating end closures applies the decoration to the metal stock material before forming the shells. Examples of this method are described in WIPO Publication Number WO 2007/007102, UK Patent No. 2,428,659, and UK Patent No. 2,428,668 which are incorporated herein by reference in their entireties. Although both coils and cut sheets of metal stock material can be decorated before the shells are formed in the conversion process, indexing and printing decorations on coils and cut sheets is complicated and cost prohibitive. In addition, there is a high probability of damaging the decoration when the stock material is used to form the end closures in the conversion process. For example, if the decoration is not properly registered with the shell press a portion of the decoration may be cut off. The decoration may also be intersected and damaged by scores or positioned in an area obstructed from view by the pull tab. Additionally, the decoration can be damaged by tools used in the conversion process.

Another known method of decorating end closures involves decorating the shells before the shells enter the conversion press. However, because shells are not oriented when they enter the conversion press, the decoration can be intersected by scores, positioned beneath the pull tab, or located partially on the tear panel. As a result, the decoration may be hidden from view by the tab or damaged when the tear panel is opened.

Methods of decorating converted end closures after the tear panel is formed and the pull tab is attached to the central panel are also known. One such method uses an optical means of orienting converted end closures prior to decorating the end closures. However, the known methods of decorating converted end closures are generally slow and/or do not apply decorations in predetermined areas of the end closure because the end closures are not oriented before the decoration is applied.

Another method or orienting an end closure is described in U.S. Pat. No. 6,524,048 to Tsukada et al. ("Tsukada"), which is incorporated by reference herein in its entirety. Tsukada generally describes an apparatus that detects a mark or pattern on an end shell and then orients an end shell. A tab is subsequently fixed to the oriented end shell. Yet another method of orienting an end closure is described in U.S. Pat. No. 4,016,968 to Stelter ("Stelter") which is incorporated by reference herein in its entirety. Stelter generally describes a method and apparatus that uses a temporary orientation tab positioned on a lower side of an end closure to rotate the end closure to a predetermined position. However, the methods described by Tsukada and Stelter are generally slow and not suited for the commercial container industry which requires an apparatus and method capable of orienting and decorating end closures at significant production speeds of at least several thousand end closures per minute.

Due to the numerous limitations associated with the existing process of manufacturing and decorating end closures, there exists an unmet need for an economical, fast, and reliable method and apparatus for orienting post-conversion end closures to enable the application of decorations and other preferred indicia to specific areas of the end closures.

SUMMARY OF THE INVENTION

The present invention provides methods and apparatus for orienting end closures relative to a reference axis in a cost-effective, fast, and reliable manner. After the end closures are oriented, the end closures may be decorated at specific areas that are not obstructed or interrupted by the pull tab or scored portions of the end closure. One aspect of the present invention is to provide methods and devices for maintaining the desired orientation of the oriented end closures to ensure that decorations are applied to specific areas of the end closures. Another aspect of the present invention is to provide an improved, economical and reliable method for applying decorations to the oriented, post-conversion end closures. Still another aspect of the present invention is to provide an orienting apparatus that can quickly and efficiently orient converted end closures in a high speed production process. In one embodiment of the present invention, the orienting apparatus is operable to orient the end closures by mechanical contact with an exterior surface portion of the end closure. In another embodiment, the orienting apparatus does not require optical or other sensors to orient the end closures.

In accordance with one aspect of the present invention, a novel method of orienting and decorating an exterior surface of an end closure for a beverage container is provided. This includes, but is not limited to, a method generally comprising: (1) providing an end closure; (2) placing an orientation head in rotational contact with an exterior surface of the end closure; (3) rotating the end closure to a predetermined orientation; (4) securing the end closure in the predetermined orientation; (5) disengaging the orientation head from the end closure; and (6) decorating a predetermined portion of the exterior surface of the end closure with an image. The end closure may comprise one or more of, but is not limited to: a peripheral curl, a chuck wall extending downwardly from the peripheral curl, a countersink interconnected to a lower end of the chuck wall, a central panel interconnected to the countersink, a tear panel in the central panel, and a tab operably interconnected to an exterior surface of the central panel. In one embodiment of the present invention, the end closure comprises a peripheral curl and a central panel. In another embodiment, the end closure includes a tab.

Additionally, the method may further comprise: (7) placing the end closure on a die cap, the die cap operable to selectively prevent rotation and movement of the end closure; (8) forming a recess in one or more printing blankets, wherein the recess is adapted to receive the tab; (9) removably affixing the printing blankets onto a drum of a coater; (10) applying a base coat material to a predetermined portion of the printing blankets; (11) transferring the base coat material from the printing blankets to the predetermined portion of the exterior surface of the end closure.

The method may further include: (12) forming a recess in one or more printing blankets, wherein the recess is adapted to receive the tab; (13) removably affixing the printing blankets onto a drum of a printer; (14) forming the image on a print head; (15) applying ink to the image; (16) transferring the ink from the print head to a predetermined portion of the printing blankets; (17) transferring the ink from the printing blankets to the predetermined portion of the exterior surface of the end closure; and (18) curing the image with ultra violet light. In one embodiment, the print head comprises six print heads, and each print head receives a different color or type of ink. In another embodiment, the printing blankets are removably affixed in from 1 to 10 rows to a circumference of the drum of the printer, and from 1 to 10 end closures are decorated simultaneously. In still another embodiment, decorating the predetermined portion of the exterior surface of the end closure comprises decorating a predetermined portion of at least one the central panel, the tear panel, and the pull tab.

In one embodiment, rotating the end closure to the predetermined orientation further comprises rotating the end closure until a Y-axis of the end closure is substantially parallel to a reference axis. In another embodiment, an angle between the Y-axis and the reference axis is less than about 5°. In one embodiment, the orientation head is operable to rotate the end closure to the predetermined orientation. In another embodiment, rotating the end closure to the predetermined orientation comprises rotating the end closure while the orientation head remains aligned with the predetermined orientation. The end closure rotates until a predetermined surface feature of the exterior surface of the end closure is engaged by the orientation head. After the orientation head engages the surface feature of the end closure, the end closure stops rotating and is aligned in the predetermined orientation.

In still another embodiment, the orientation head comprises a body portion, a face portion, a pocket formed in the face portion to receive the pull tab of the end closure, a tapered portion extending from the face portion to a bottom of the pocket, and a wall extending from the bottom of the pocket substantially vertically to the face portion, wherein when the orientation head is rotated the pull tab slides into the pocket and is retained in the pocket by the wall.

In accordance with another aspect of the present invention, an apparatus for orienting and decorating an exterior surface of an end closure which is adapted for interconnection to a neck of a beverage container is disclosed, the apparatus operable to simultaneously orient and decorate multiple end closures. The apparatus generally comprises, but is not limited to: (1) a balancer operable to receive the end closure and place the end closure in a holder, the holder operable to move the end closure through the apparatus and selectively prevent rotation of the end closure; (2) an orientor, the orientor operable to receive the holder with an end closure and rotate the end closure to a predetermined orientation, wherein the holder prevents rotation of the end closure from the predetermined orientation; (3) a coater operable to apply a base coat material to a predetermined portion of the exterior surface of the end closure; (4) a printer operable to transfer an image to a predetermined portion of the end closure; and (5) at least one curer operable to cure the base coat material and the image. In one embodiment, the end closure comprises a peripheral curl, a central panel, and a tab interconnected to an exterior surface portion of the central panel. In another embodiment, the end closure is comprised of a peripheral curl, a chuck wall extending downwardly therefrom, a countersink interconnected to the chuck wall, and a central panel interconnected to the countersink.

In one embodiment, the orientor includes an orientation head having a geometry adapted to locate and engage an exterior surface feature on the end closure. In one embodiment, the exterior surface feature is a pull tab interconnected to an exterior surface of the central panel. In another embodiment, the exterior surface feature is a tear panel of the central panel. In still another embodiment, the exterior surface feature is the central panel. In another embodiment, the orientation head comprises a body portion, a face portion, a pocket formed in the face portion to receive the pull tab of the end closure, a tapered portion extending from the face portion to a bottom of the pocket, and a wall extending from the bottom of the pocket substantially vertically to the face portion, and wherein the orientation head is operable to rotate around a longitudinal axis of the body portion.

In one embodiment, the orientation head is fixed in alignment with the predetermined orientation. The face portion of the orientation head is adapted to contact the exterior surface portion of the end closure and allow the end closure to rotate. The orientation head is further adapted to stop the rotation of the end closure when the end closure is aligned with the predetermined orientation. In another embodiment, the orientation head is adapted to rotate around a longitudinal axis substantially perpendicular to the face portion of the orientation head. The orientation head is adapted to engage a predetermined exterior surface feature of the end closure and rotate the end closure to the predetermined orientation. The orientation head rotates the end closure until the end closure is in the predetermined orientation.

In one embodiment, the holder includes a clamp that applies pressure to the end closure to hold the end closure in the predetermined orientation. In yet another embodiment, the apparatus is operable to orient and decorate from 1 to 5 end closures simultaneously.

In one embodiment, the printer generally comprises, but is not limited to, (1) at least one print head with the image formed thereon; (2) an inker operable to transfer ink to the image on the print head; and (3) a drum, the drum having a circumference with one or more printing blankets affixed thereto, the printing blankets each having a recess adapted to receive a pull tab interconnected to the exterior surface of the end closure, the drum operable to move the printing blankets into rotational contact with the print head and the exterior surface of the end closure, wherein the image is transferred from the print head to the printing blankets and then to the predetermined portion of the end closure.

It is another aspect of the present invention to provide an orientation head for an orientor used to position an end closure in a decorating process. The orientation head generally comprises: (1) a body portion; (2) a face portion, the face portion oriented in a plane generally perpendicular with respect to a longitudinal axis of the body portion; and (3) a pocket formed in a portion of the face portion, the pocket having a size adapted to receive a pull tab of the end closure, the pocket having a bottom end substantially parallel to the face portion, a first side sloping upward from the bottom end to the face portion, and a second side forming a substantially vertical wall from the bottom end to the face portion. In one embodiment, the body portion is adapted to be interconnected to an orientor used in an end closure decorating process.

In one embodiment, the orientation head is adapted to rotate around the longitudinal axis. In another embodiment, the face portion of the orientation head is adapted to slide across an exterior surface of a pull tab interconnected to the end closure as the orientation head rotates. In still another embodiment, the orientation head does not rotate around the longitudinal axis as the end closure is rotated around the longitudinal axis. In yet another embodiment, the face portion is adapted to enable the exterior surface of the pull tab interconnected to the end closure to slide across face portion as the end closure rotates while the orientation head does not rotate.

In another embodiment, the orientation head is fixed in a predetermined orientation and is adapted to engage a predetermined surface feature of an end closure when the end closure rotates to the predetermined orientation.

In another embodiment, the first side is adapted to direct a pull tab interconnected to the end closure from the face portion into the pocket. In yet another embodiment, the wall is adapted to retain a pull tab interconnected to the end closure in the pocket and the wall applies a force to a side surface of the pull tab to rotate the end closure to a predetermined orientation. In one embodiment, the face portion comprises a substantially planar surface. In one embodiment, the pocket has a depth greater than a distance between the exterior surface of the pull tab and the end closure to which the pull tab is interconnected. Thus, the exterior surface of the pull tab does not contact the bottom portion of the pocket when the pull tab is engaged by the orientation head. In another embodiment, the pocket has a depth that is less than or about equal to the distance between the exterior surface of the pull tab and the end closure to which the pull tab is interconnected. Accordingly, the exterior surface of the pull tab may contact the bottom portion of the pocket when the pull tab is engaged by the orientation head.

In one embodiment, at least a portion of the pocket is adapted to engage the pull tab of the end closure and apply a rotational force to the end closure. In another embodiment, at least a portion of the pocket is adapted to engage the pull tab of the end closure to stop the rotation of the end closure when the end closure is in the predetermined orientation. In one embodiment, the pocket includes an opening that forms a void in a portion of the body portion of the orientation head. In another embodiment, the pocket has a asymmetric shape.

Still another aspect of the present invention is a novel method of orienting and decorating an end closure for a container. The method includes, but is not limited to: (1) providing a plurality of end closures which are adapted for interconnection to a neck of a container; (2) feeding at least one end closure into a first end of a guide assembly of an orientor; (3) engaging an orientation head of the orientor with an exterior surface of the end closure; (4) rotating the at least one end closure to align the at least one end closure in a predetermined orientation; (5) placing the end closure on a holder proximate to the second end of the guide assembly of the orientor; (6) disengaging the orientation head from the end closure; and (7) decorating a predetermined portion of the exterior surface of the end closure. The decoration may be in any orientation and any location of the exterior surface of the end closure. As will be appreciated, after the end closure is oriented in the predetermined orientation, the end closure may be decorated by any method known to those of skill in the art. For example, in one embodiment, the end closure is decorated using one or more printing processes including, but not limited to, offset printing, dry offset printing, gravure printing, intaglio printing, screen printing, tampo printing, and inkjet printing. In another embodiment of the present invention, the end closure is decorated by a laser marking system. Accordingly, in one embodiment of the present invention, decorating the predetermined portion of the exterior surface of the end closure comprises one or more of an image, a laser marking, a code, and a text message formed on the end closure by any means. In one embodiment, the end closure is comprised of a peripheral curl, a chuck wall extending downwardly therefrom, a countersink interconnected to the chuck wall, and a central panel interconnected to the countersink.

In one embodiment of the present invention, the guide assembly further comprises an inner rail interconnected to an outer rail. The inner and outer rails are separated by a distance approximately equal to a height of the end closure. The inner and outer rails are operable to retain the exterior surface of the end closure in contact with the orientation head as the orientation head moves the end closure from the first end to the second end of the guide assembly. In another embodiment, the guide assembly of the orientor has a substantially arcuate shape.

In one embodiment of the present invention, the orientation head of the orientor is interconnected to a distal end of a spoke. In another embodiment, the spoke is operable to rotate the orientation head around a longitudinal axis of the spoke. In still another embodiment, a first end of the spoke is interconnected to a hub of the orientor. The hub is operable to rotate axially at a predetermined rate. In still another embodiment, the spoke is adapted to move the orientation head along an arcuate path from the first end to the second end of the guide assembly.

In one embodiment, the spoke is further adapted to rotate the orientation head around the longitudinal spoke axis as the spoke moves the orientation head from the first end to the second end of the guide assembly. In another embodiment, the spoke is adapted to begin rotating the orientation head at a first point and stop rotating the orientation head at a second point as the hub of the orientor rotates axially. In one embodiment, the first point is proximate to the first end of the guide assembly and the second point is between the first end and the second end of the guide assembly. In still another embodiment, the spoke further comprises a first gear adapted to engage a bevel gear of the hub. The first gear and the bevel gear are adapted to initiate rotation of the orientation head at the first point and stop rotation of the orientation head at the second point.

In one embodiment, the spoke is adapted to rotate the orientation head a predetermined number of times around the longitudinal spoke axis. In another embodiment, the spoke is adapted to rotate the orientation head one time around the longitudinal spoke axis. In yet another embodiment, the spoke is adapted to rotate the orientation head between approximately one time and approximately four times around the longitudinal spoke axis.

In another embodiment of the present invention, the orientor is operable to rotate the end closure around a longitudinal axis of the spoke while the orientation head remains aligned with the predetermined orientation. The orientation head is operable to stop the rotation of the end closure when the end closure is aligned in the predetermined orientation. In one embodiment of the present invention, a predetermined portion of the end closure contacts a stationary structure of the orientor. The contact between the end closure and the stationary structure causes the end closure to rotate around the longitudinal spoke axis. In one embodiment, the stationary structure is a friction rail. In another embodiment, one or more of the inner and the outer rails are adapted to apply a frictional force sufficient to rotate the end closure. In still another embodiment, a drive roller or a motion belt of the orientor are adapted to rotate the end closure.

In one embodiment of the present invention, the spoke comprises a plurality of spokes interconnected to the hub of the orientor. In another embodiment, the spoke comprises six spokes. In still another embodiment, the spoke comprises from two to nine spokes interconnected to the hub of the orientor.

In one embodiment, rotating the end closure to align the end closure in a predetermined orientation further comprises rotating the end closure until a Y-axis of the end closure is substantially parallel to a reference axis. In another embodiment, an angle between the Y-axis and the reference axis is less than about 5°.

In yet another embodiment, decorating a predetermined portion of the exterior surface of the end closure further comprises providing one or more printing blankets. Each printing blanket comprising a recess adapted to receive a pull tab which is interconnected to the exterior surface of the end closure. The printing blankets are removably affixed onto a drum of a printer. A image is formed on a print head. Ink is applied to the image. The ink is then transferred from the print head to a predetermined portion of the printing blankets. The ink is transferred from the printing blankets to the predetermined portion of the exterior surface of the end closure.

In accordance with another aspect of the present invention, a novel apparatus for receiving and orienting an end closure which is adapted for interconnection to a neck of a container is disclosed. The apparatus generally comprises: (1) an arcuate guide assembly comprising a first end and a second end, the first end adapted to receive an end closure and the second end adapted to release the end closure; (2) a hub operable to rotate proximate to the arcuate guide assembly at a predetermined rate; (3) a plurality of spokes radially interconnected to the hub; and (4) an orientation head interconnected to a distal end of each spoke, the orientation head adapted to engage an exterior surface portion of the end closure at the first end of the arcuate guide assembly and align the end closure to a predetermined orientation as the orientation head and the end closure move axially from the first end to the second end of the arcuate guide assembly.

In one embodiment, at least a portion of each of the plurality of spokes is operable to rotate around a longitudinal axis of each spoke. In another embodiment, the apparatus further comprises a bevel gear operably engaged to the hub and a pinion gear interconnected to the spoke. The bevel gear comprises a face portion oriented substantially perpendicular to an axis of rotation of the hub. Teeth are formed on a portion of an annulus of the face portion of the bevel gear. Accordingly, teeth of the pinion gear engage the teeth formed on the bevel gear to rotate the rotatable portion of the spoke and an orientation head interconnected thereto during a predetermined portion of each rotation of the hub.

In another embodiment of the present invention, the arcuate guide assembly further comprises an inner portion spaced from an outer portion. At least a portion of the exterior surface portion of the end closure contacts the inner portion of the arcuate guide assembly. In addition, at least a portion of an interior surface portion of the end closure contacts the outer portion of the arcuate guide assembly.

In one embodiment, the orientation head further comprises a body portion interconnected to the spoke. A face portion of the orientation head comprises a substantially planar surface orientated in a plane generally perpendicular to the body portion. A pocket is formed in a portion of the face portion, the pocket comprising a geometric profile adapted to receive a pull tab interconnected to the exterior surface portion of the end closure. In another embodiment, the orientation head is adapted to engage the exterior surface of the end closure. The orientation head rotates the end closure around the longitudinal spoke axis as the orientation head and the end closure travel between the first end and second end of the arcuate guide assembly.

In still another embodiment of the present invention, the apparatus is operable to rotate the end closure around a longitudinal spoke axis as the orientation head and the end closure move between the first end and second end of the arcuate guide assembly. During the movement between the first end and the second end, the orientation head does not rotate around the longitudinal spoke axis. The orientation head is operable to stop the rotation of the end closure when the end closure is aligned to the predetermined orientation. In one embodiment, a portion of the arcuate guide assembly applies a friction force to the end closure which causes the end closure to rotate around the longitudinal spoke axis. In one embodiment, the portion of the arcuate guide assembly is a friction rail. In another embodiment, one or more of the inner and the outer rails are adapted to apply the frictional force to the end closure. In still another embodiment, a drive roller or a motion belt associated with the arcuate guide assembly are adapted to rotate the end closure.

In one embodiment of the present invention, the apparatus comprises two arcuate guide assemblies and a hub associated with each arcuate guide assembly. In yet another embodiment, the apparatus comprises four arcuate guide assemblies with a hub associated with each arcuate guide assembly. In still another embodiment, the apparatus comprises from one to eight arcuate guide assemblies and hubs. Each hub has a plurality of spokes. In one embodiment of the present invention, the plurality of spokes comprises six spokes interconnected to each hub. In another embodiment, the plurality of spoke comprises from two to ten spokes interconnected to each hub. Each distal end of the plurality of spokes comprises an orientation head.

In accordance with another aspect of the present invention, a novel method of orienting a metallic end closure is provided. This includes, but is not limited to, a method generally comprising: (1) providing an orientor, comprising: an arcuate guide assembly including a first end, a second end, and a means for engaging and supporting an end closure; a hub operable to rotate at a predetermined rate; a plurality of spokes extending radially from the hub; and an orientation head interconnected to the distal end of each spoke, the orientation head having a face portion adapted to engage an exterior surface portion of an end closure, wherein each of the plurality of spokes are adapted to move the face portion of the orientation head interconnected thereto from the first end to the second end of the arcuate guide assembly; (2) receiving an end closure at the first end of the arcuate guide assembly, and wherein a pull tab interconnected to the exterior surface portion of the end closure is positioned proximate to a face portion of one of the orientation heads; (3) rotating the hub, wherein the face portion of the orientation head engages the end closure and moves the end closure from the first end to the second end of the arcuate guide assembly; and (4) rotating the end closure around a longitudinal axis of the spoke associated with the orientation head such that the end closure and the pull tab are aligned in a predetermined orientation when the end closure exits the second end of the arcuate guide assembly. In one embodiment, the method further comprises disengaging the orientation head from the end closure after the end closure is aligned in a predetermined orientation. In one embodiment, the end closure is adapted for interconnection to a beverage container. The end closure may comprise a peripheral curl, a chuck wall extending downwardly from the peripheral curl, a countersink interconnected to a lower end of the chuckwall, and a central panel interconnected to the countersink.

In one embodiment of the present invention, at least a portion of each of the plurality of spokes is operable to rotate around a longitudinal spoke axis. In another embodiment, the orientor further comprises a bevel gear interconnected to the hub and a pinion gear interconnected to each of the plurality of spokes. The bevel gear comprises a predetermined number of teeth formed on a portion of the bevel gear. In this manner, when the hub rotates, the teeth of the pinion gears engage the teeth of the bevel gear and at least the rotatable portion of each spoke and the orientation head interconnected thereo rotates.

In another embodiment of the present invention, the orientation heads of the orientor do not rotate around the longitudinal spoke axis. The orientation heads are aligned in a fixed position with respect to the predetermined orientation. The arcuate guide assembly is operable to rotate the end closure around the longitudinal spoke axis. As the end closure rotates in contact with the face portion of the orientation head, the pull tab interconnected to the end closure rotates and is engaged by the orientation head. The engagement of the pull tab by the orientation head prevents further rotation of the end closure. In one embodiment, contact between a portion of the arcuate guide assembly and the end closure causes the end closure to rotate around the longitudinal spoke axis. In another embodiment, the arcuate guide assembly includes a friction rail adapted to rotate the end closure. In another embodiment, the means for engaging and supporting of the arcuate guide assembly is operable to rotate the end closure. In still another embodiment, the orientor further comprises one or more of a drive roller and a motion belt operable to rotate the end closure.

In another embodiment, the spoke is biased in a radially extended position. Thus, the face portion of the orientation head applies a force to the exterior surface portion of the end closure when the end closure is engaged to the face portion of the orientation head.

The arcuate guide assembly may engage and support the end closure through a variety of devices and means. In one embodiment, the means for engaging and supporting includes at least two rails. In another embodiment, the means for engaging and supporting includes an inner rail interconnected to an outer rail. The inner and outer rails are separated by a distance approximately equal to a height of the end closure. In still another embodiment, the means for engaging and supporting includes a first end and a second end, the first end adapted to receive an end closure and the second end adapted to release the end closure. In yet another embodiment, the means for engaging and supporting includes an inner portion spaced from an outer portion. The inner and outer portions are adapted to contact predetermined portions of the end closure. In still another embodiment, the means for engaging and supporting is operable to rotate the end end closure.

The above-described embodiments, objectives, and configurations are neither complete nor exhaustive. As will be appreciated, other embodiments of the invention are possible using, alone or in combination, one or more of the features set forth above or described in detail below.

References made herein to "end closures," or "container end closures" should not necessarily be construed as limiting the present invention to a particular size, shape, or type of end closure. It will be recognized by one skilled in the art that the present invention may be used to orient and decoration end closures of any variety, size, or type, including end closures with one or more pour or vent openings or other areas or features. An end closure may comprise one or more of, but is not limited to: a peripheral curl, a chuck wall extending downwardly from the peripheral curl, a countersink interconnected to a lower end of the chuck wall, a central panel interconnected to the countersink, a tear panel in the central panel, and a tab operably interconnected to an exterior surface of the central panel. In one embodiment of the present invention, the end closure comprises a peripheral curl and a central panel. In another embodiment, the end closure includes a tab interconnected to an exterior surface portion of the central panel.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

References made herein to "decoration" should not necessarily be construed as limiting the present invention to a particular type or method of printing, enhancing, or decorating end closures. Those of skill in the art will recognize that the present invention may be used with any variety of decorating processes, including lithography, offset printing, dry offset printing, gravure printing, intaglio printing, screen printing, tampo printing, inkjet printing, flexographic printing, laser printing, and combinations thereof. Further, the term "decoration" as used herein refers to any indicia placed on the end closure for any purpose, including identifying the contents, location and date of manufacture, recommended use date, manufacturer of the container or container component, providing trade names, advertising, promotion, or the like. In addition, it will be understood that the term decoration may include the application of primers, coatings, and decorative inks of all types to the end closures.

References made herein to "lithographic printing" or aspects thereof should not necessarily be construed as limiting the present invention to a particular method or type of printing. It will be recognized by one skilled in the art that the present invention may be used in other printing processes such as offset printing, dry offset printing, gravure printing, intaglio printing, screen printing, laser printing, and inkjet printing.

As will be appreciated by one of skill in the art, the method and apparatus of the current invention may be used to orient and decorate end closures any material. Further, the method and apparatus of the current invention may be used orient and decorate end closures of any size, shape, and type for any type of container, including, but not limited to, metallic beverage containers and metallic food containers.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF DRAWINGS

The accompanying drawings, which are incorporated herein and constitute a part of the specification, illustrate embodiments of the invention and together with the Summary of the Invention given above and the Detailed Description of the drawings given below serve to explain the principles of these embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

FIG. 9A is a front elevation view a wheel and guide assembly of the orientor of FIG. 8 with a cover portion of the wheel removed to show bevel gears associated with spokes of the orientor;

FIG. 9B is a side elevation view of the wheel and guide assembly of FIG. 9A;

FIG. 11 is a perspective view of an orientor of the present invention comprising four wheels arranged in two staggered rows and further illustrating a holder receiving oriented end closures from the orientor;

Figure 1:
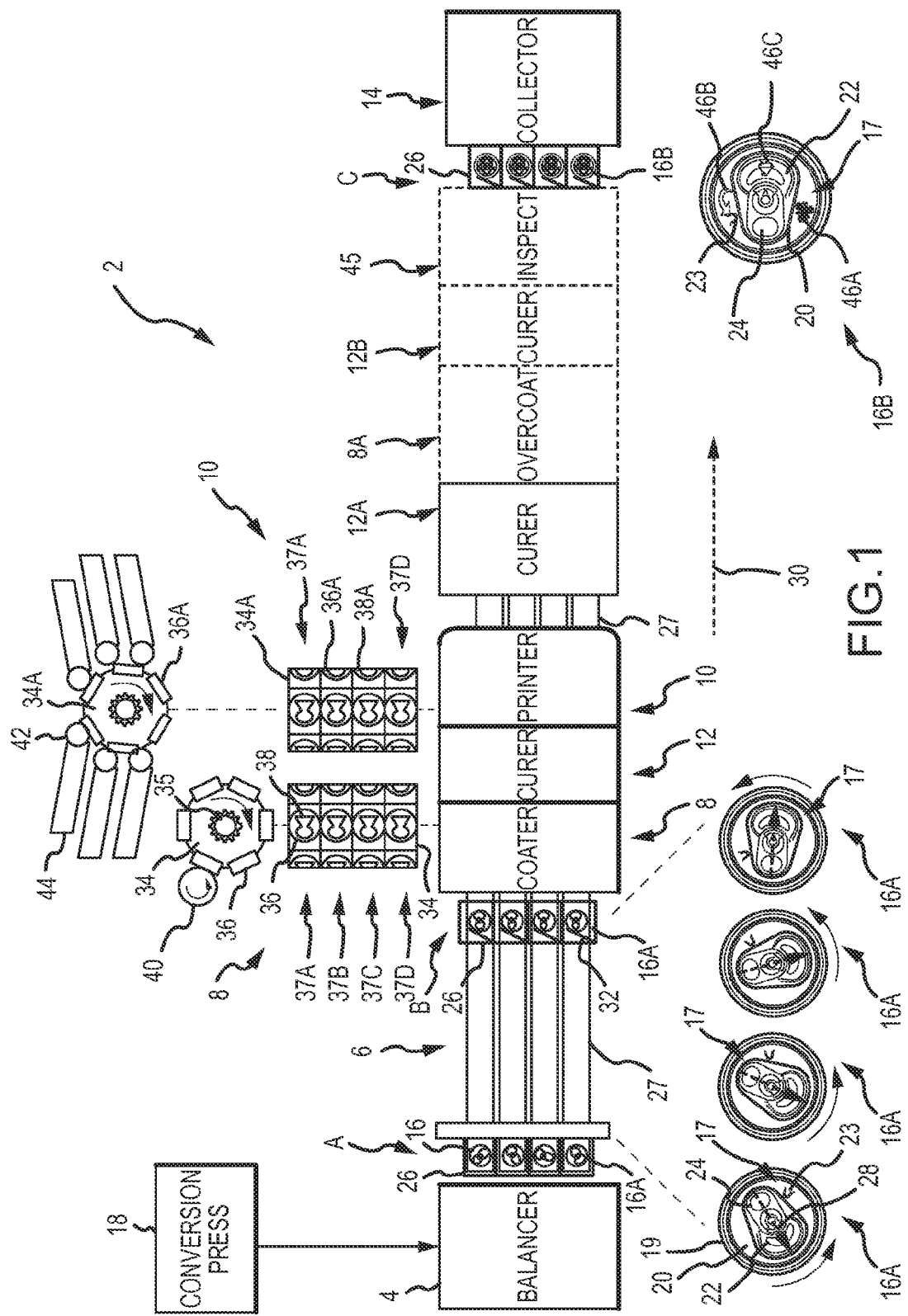
FIG. 1 is a schematic flow diagram of one embodiment of the present invention which depicts a system for orienting and decorating end closures.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
| --- | --- |
| 2 | Orienting and decorating system |
| 4 | Balancer |
| 6 | Orientor |
| 8 | Coater |
| 10 | Printer |
| 12 | Curer |
| 14 | Collector |
| 15 | Interior surface of end closure |
| 16 | End closure |
| 17 | Exterior surface of end closure |
| 18 | Conversion press |
| 19 | Peripheral curl |
| 20 | Central panel |
| 22 | Tear panel |
| 23 | Secondary vent panel |
| 24 | Pull tab |
| 25 | Pull tab side surface |
| 26 | Holder |
| 27 | Chain |
| 28 | Y-axis |
| 30 | Reference axis |
| 32 | Clamping mechanism |
| 34 | Drum |
| 35 | Gear |
| 36 | Printing blankets |
| 37 | Rows of blankets |
| 38 | Recess |
| 40 | Application roller |
| 42 | Print head |
| 44 | Inker |
| 45 | Inspection station |
| 46 | Image |
| 48 | Die cap |
| 50 | Body |
| 52 | Bore |
| 54 | Face |
| 56 | Aperture |
| 58 | Clamp |
| 60 | Clamp end |
| 62 | Orientation head |
| 64 | Chain |
| 66 | Wheels |
| 68 | Chain |
| 70 | Orientation head body |
| 72 | Longitudinal axis |
| 74 | Head |
| 76 | Face |
| 78 | Tapered portion |
| 80 | Pocket |
| 82 | Wall |
| 83 | Endwall |
| 84 | Method of decorating and orienting end closures |
| 86 | Start |
| 88 | Load end closures |
| 90 | Rotate end closures |
| 92 | Lock end closures in predetermined orientation |
| 94 | Inspect for proper orientation |
| 96 | Pre-treat end closures |
| 98 | Apply and cure base coating |
| 100 | Decoration applied and cured |
| 102 | Optional over-coat applied and cured |
| 104 | Inspect end closures |
| 106 | Collect rejected end closures |

-continued

| Number | Component |
| --- | --- |
| 108 | Collect decorated end closures |
| 110 | End |
| 120 | Orienting and decorating system |
| 124 | Feeder |
| 126 | Orientor |
| 128 | Wheel |
| 129 | Motor |
| 130 | Guide assembly |
| 132 | Mount |
| 133 | Axle |
| 134 | Mounting plate |
| 136 | Bearing |
| 138 | Bevel gear |
| 139 | Anti-rotation guide |
| 140 | Hub |
| 142 | Hub apertures |
| 144 | Spoke |
| 145 | Spoke bearing |
| 146 | Pinion |
| 148 | First axle |
| 149 | Pinion bearing |
| 150 | Second axle |
| 152 | Tension spring |
| 154 | Linear spline assembly |
| 156 | First End |
| 158 | Second End |
| 160 | Inner rails |
| 162 | First extensions of inner rails |
| 164 | Second extensions of inner rails |
| 166 | Pinion teeth |
| 168 | Bevel gear teeth |
| 170 | Outer rails |
| 172 | Rail |
| 174 | Rail end |
| 176 | Sensor |
| 178 | Protrusion of holder |
| 180 | Method |
| 182 | Start |
| 184 | Feeder separates end closures |
| 186 | Orientor receives end closures |
| 188 | Orientation head rotates end closures |
| 190 | Inspection |
| 192 | Collect rejected end closures |
| 194 | Load end closures in holder |
| 196 | Optional pre-treatment |
| 198 | Pre-coat applied and cured |
| 200 | Decoration applied and cured |
| 202 | Over coated applied |
| 204 | Decoration inspected |
| 206 | Passing end closures collected |
| 208 | End |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1, a system 2 for orienting and decorating end closures at a predetermined location is illustrated. The system generally includes a balancer 4, an orientor 6, a coater 8, a printer 10, a curer 12, and a collector 14.

The balancer 4, in one embodiment, receives converted end closures 16 from a conversion press 18. In one embodiment, the end closures 16 are transported from the conversion press 18 to the balancer 4 in a cylindrical stack (not illustrated). The cylindrical stack includes a rod with the end closures stacked along the axis of the rod. The end closures 16 generally include a peripheral curl 19, a central panel 20, a tear panel 22, and a pull tab 24 operably interconnected to an exterior surface 17 of the end closure 16. Optionally, other features may be formed on the end closure, such as a secondary vent panel 23. Each end closure 16 has a Y-axis 28 aligned with a diameter of the end closure and that generally divides each end closure and tab 24 into substantially symmetric halves.

The balancer 4, in one embodiment, is a mechanical sponge that controls the flow of the end closures 16 between the conversion press 18 and the system 2. The balancer 4 maintains the proper speed and flow of the end closures 16 to ensure a consistent, non-interrupted flow of end closures into the orientor 6. The balancer 4 accumulates end closures 16 from the conversion press 18 to ensure the system 2 is supplied with end closures 16 if the conversion press 18 or other upstream equipment goes offline, for example, for maintenance, during unscheduled stops, or when new coils of sheet metal are loaded in the uncoiler (not illustrated).

In one embodiment, the balancer 4 loads the end closures 16 into a flight or holder 26 with the pull tab 24 facing upward. The holders 26 stabilize and transport the end closures 16 through the system and provide support to the end closures 16 when the end closures are decorated and cured. When loaded into the holders 26 at point A, the end closures are unoriented with the tabs 24 and tear panels 22 of each end closure 16 randomly oriented with respect to the reference axis 30 of the system 2. Further, the Y-axis 28 of an end closure 16 may not be parallel to the Y-axis of another end closure.

The holders 26 are adapted to rotate through the system from point A to point C. In one embodiment, the holders 26 are interconnected to a belt or a chain 27 that forms a continuous loop that rotates through the system 2 from point A to point C. In another embodiment, two chains 27 form the continuous loop. Although only three holders 26 are illustrated, it should be understood by one skilled in the art that any number of holders 26 can be used with the system 2 of the present invention. The holders 26 are generally spaced at regular intervals along the chain 27 in the system 2. In one embodiment, the holders are comprised of two longitudinal rails connected by shorter lateral rungs. The rails and rungs form pockets in the holders 26 that are adapted to receive the end closures. The size of each holder 26 can be increased or decreased to hold end closures 16 of any size. The holders 26 are operable to allow the end closures 16 to rotate about a vertical axis when the holders 26 transport the end closures through the orientor 6. The vertical axis is substantially centered on the central panel 20 of the end closures and perpendicular to the Y-axis 28. In one embodiment, the holders 26 control the position of the end closures by contact with an inside surface of the central panel or by contact with an outside surface of a peripheral curl of the end closure.

Although the holders 26 illustrated in FIG. 1 are shown with four end closures 16, it will be appreciated by one of skill in the art that the holders 26 may be configured to transport fewer or more end closures. For example, in one embodiment, the system 2 is designed to orient and decorate one end closure 16 at a time and the holders 26 transport one end closure. In another embodiment, the system 2 is designed to orient and decorate two end closures simultaneously and the holders 26 transport two end closures. In still another embodiment, the holders 20 can transport five end closures 16 through the system 2. In yet another embodiment up to 12 end closures 16 are transported by each holder 26. The holders 26 transport the end closures 16 through the system 2 with a line drawn through a center of each end closure generally perpendicular to the reference axis 30 of the system 2.

Figure 2:
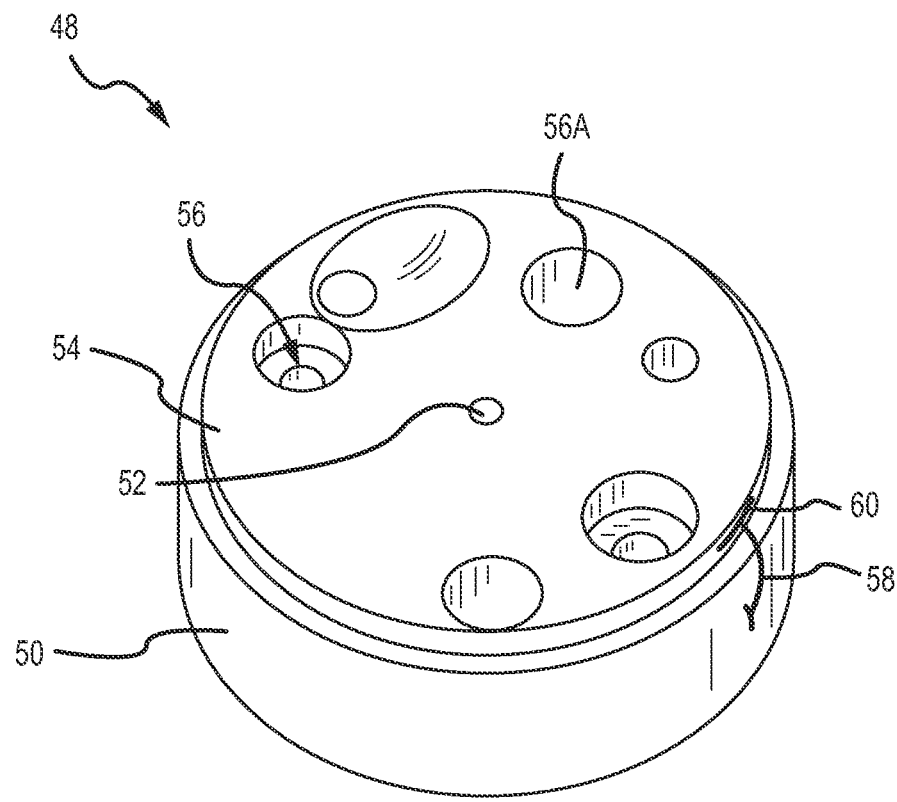
FIG. 2 is a perspective view of one embodiment of a die cap of the present invention which is adapted for holding an end closure.

Referring now to FIG. 2, the holders may include a die cap 48 adapted to receive each end closure 16. The die cap 48 has a generally cylindrical body 50 with a diameter approximately equal to an inside diameter of the end closures 16. One or more ridges, bumps, or protrusions may be formed on body 50 to frictionally engage the inside surface of the end closures. Optionally, the bumps are biased and can be extended from, or retracted into, the body 50 to increase or decrease friction between the die cap 48 and the end closure 16.

In one embodiment of the present invention, the die cap 48 is interconnected to a holder 26 by an axle (not illustrated) retained in a bore 52. During orientation of an end closure 16, the die cap 48 can rotate around the bore 52. After the end closure 16 is oriented, the die cap 48 can lock the axle to prevent unintended or inadvertent rotation of the die cap 48 to keep the end closure 16 oriented. The die cap 48 has a generally flat or substantially linear face portion 54 that is generally perpendicular to a longitudinal axis of the body 50. In one embodiment of the present invention, one or more apertures 56 are formed in the face portion 54. The apertures 56 are interconnected to a vacuum pump and are operable to apply a suction force to an interior surface of the end closure to prevent movement of the end closure 16. Optionally, another aperture 56A is interconnected to a tank of a compressed gas, such as air. To release the end closure 16 from the die cap 48, a flow of the compressed gas is released from the tank through the aperture 56A to blow the end closure 16 off of the die cap 48. Additionally, a pivoting clamp 58 may be positioned on the body 50. The clamp 58 is illustrated in an engaged position in which clamp end 60 applies a force to a circumferential surface of an end closure (not illustrated) to prevent unintended rotation of the end closure 16 on the die cap 48. The clamp 58 can pivot to a disengaged position such that the end 60 does not contact the end closure 16. In one embodiment, the clamp 58 comprises three clamps 58 spaced around the circumference of the body 50. In this embodiment, each clamp 58 can be moved to an engaged or disengaged position independently.

Figure 3:
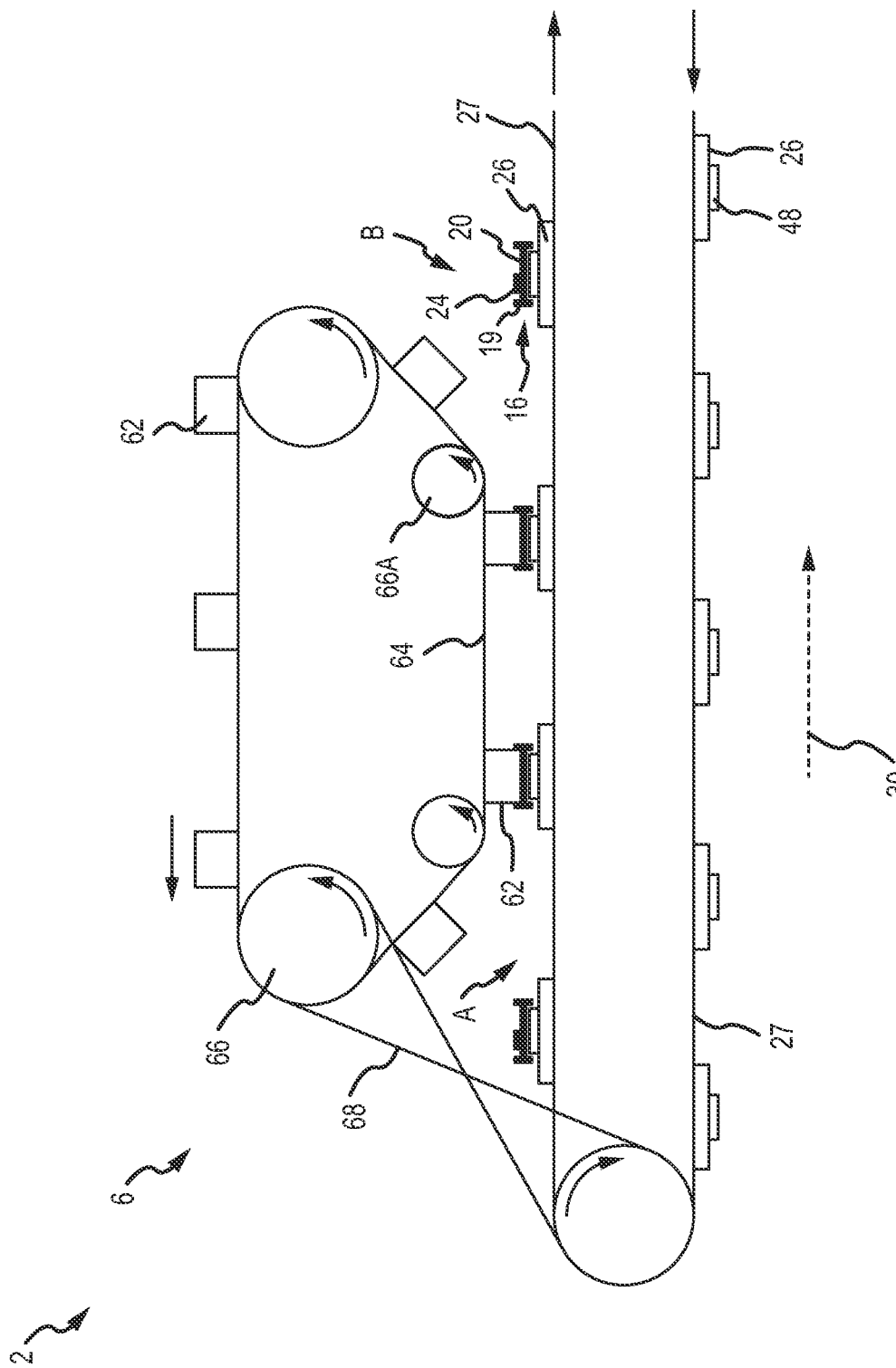
FIG. 3 is a side elevation view of the system of FIG. 1 illustrating an end closure orientation assembly in one embodiment of the present invention.

Referring now to FIG. 3, one embodiment of the orientor 6 is illustrated. The orientor 6 includes orientation heads 62 that are brought into rotational contact with an exterior surface of the unoriented end closures 16. In one embodiment, the orientation heads 62 are interconnected to a belt or chain 64 that is flexible. In one embodiment, the chain 64 is positioned above the path of the holders 26 through the system 2. The orientation heads 62 are spaced on the chain 64 to match the spacing of the holders 26. The orientor 6 includes a sufficient number or orientation heads 62 to contact each end closure 16 positioned in each holder 26. The chain 64 forms a continuous loop around wheels 66. The movement of the orientation heads 62 on the chain 64 is synchronized by a belt or chain 68 operably interconnected to the chain 27 to which the holders are attached such that the orientation heads 62 move at the same rate through the system 2 as the holders 26. As the chain 64 rotates, the orientation heads 62 are lowered into contact with the end closures 16 that are randomly oriented at point A.

As the holders 26 move the end closures 16 through the orientor 6, the end closures 16 are rotated to a preferred orientation with respect to the reference axis 30. In one embodiment of the present invention, as discussed in conjunction with FIGS. 5A-5C, below, the orientation heads 62 rotate the end closures to the preferred orientation. In another embodiment of the present invention, the holders 26 are adapted to rotate the end closures while the orientation heads do not rotate and remain aligned with the preferred orientation. The orientation heads 62 have a geometry adapted to locate and engage an exterior surface feature of the end closures 16. In one embodiment, the exterior surface feature is a pull tab 24 interconnected to the exterior surface 17 of the central panel 20. In another embodiment, the exterior surface feature is a tear panel 22 of the central panel 20. In still another embodiment, the exterior surface feature is the central panel 20. In yet another embodiment, the exterior surface feature is a rivet that interconnects the pull tab 24 to the central panel 20. In still another embodiment, the exterior surface feature is a debossed area formed in the central panel 20. In another embodiment, the exterior surface feature is a score formed on the end closure 16. When the holders 26 exit the orientor near point B, the end closures 16 are aligned at the preferred orientation.

Although FIG. 3 illustrates an embodiment of the present invention in which the orientation heads are lowered into contact with the unoriented end closures 16, it will be appreciated by one of skill in the art that other methods of bringing the orientation heads 62 into contact with the end closures may be used with the present invention. In one embodiment, the orientation heads 62 are positioned on a lever that moves the orientation heads 62 into contact with the unoriented end closures 16. After the end closures are oriented, the lever moves the orientation heads 62 off of the oriented end closures 16.

It should be understood that although only one orientor 6 is illustrated in FIG. 3, any number of orientors 6 may be used in parallel in the system 2 of the present invention. For example, in one embodiment illustrated in FIG. 1, the system 2 has four orientors 6. In another embodiment, the system 2 has six orientors 6.

Figure 4:
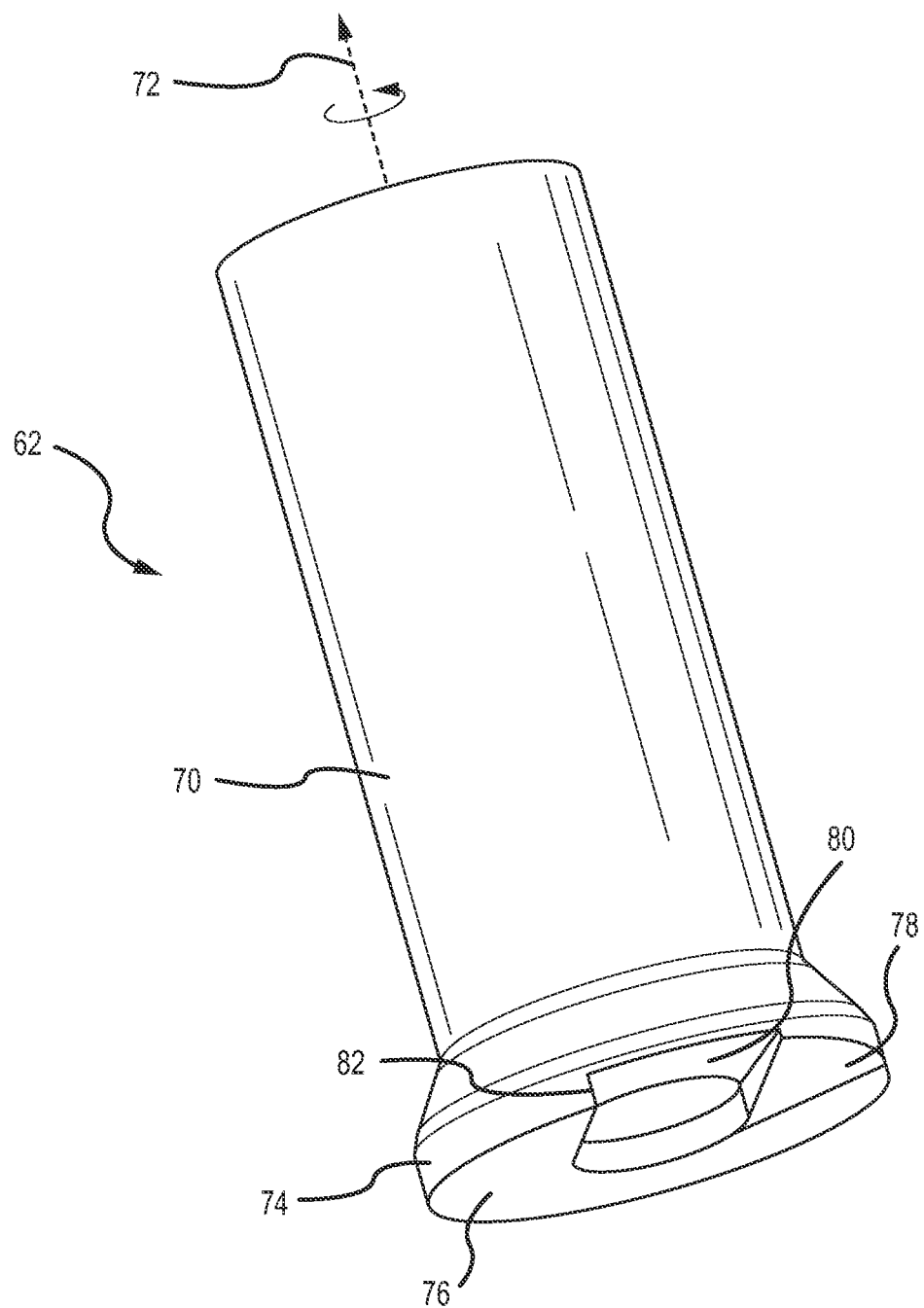
FIG. 4 is a perspective view of an orientation head of one embodiment of the present invention.

Referring now to FIG. 4, an embodiment of an orientation head 62 adapted to orient an end closure 16 is illustrated. The orientation head 62 has a body 70 that is interconnected to the chain 64 of the orientor 6. In one embodiment, the body 70 has a generally cylindrical shape. The body 70 has a head 74 at an end distal from the chain 64. In one embodiment, the head 74 has a diameter greater than the diameter of the body 70. In another embodiment, the head 74 has the same diameter as the body 70. In yet another embodiment, the head 74 has a diameter that is less than the diameter of the body 70. The head 74 has a face portion 76 that is generally perpendicular to a longitudinal axis 72 of the body 70. The face portion 76 is adapted to allow an exterior surface of a pull tab 24 of an end closure 16 to slide along the face portion 76 as one of the orientation head 62 and the end closure 16 rotates without applying a rotational force to the pull tab 24. A feature is formed on the face portion 76 that engages a predetermined portion of the end closure. In one embodiment, the feature is a pocket 80 formed in a portion of the face portion 76. In one embodiment, the pocket 80 captures and rotates a tab 24 and applies a force to a portion of the tab 24 to rotate the end closure 16 to a predetermined orientation. In another embodiment, the pocket 80 engages the tab 24 and applies a force to a portion of the tab 24 to stop rotation of the end closure when the end closure has been rotated to the predetermined orientation. In one embodiment, the pocket 80 includes a tapered portion 78 that slopes into the face portion 76 toward the body 70 and forms a first side of the pocket 80. The tapered portion 78 is adapted to enable the tab 24 to slide into the pocket 80. The pocket 80 is adapted to receive the pull tab 24 as one of the orientation head 62 and the end closure are rotated about the longitudinal axis 72. A wall 82 extends substantially vertically upward from the pocket 80 to the face portion 76 and forms a second side of the pocket 80. The wall 82 is adapted to engage and apply a force to a side surface of the pull tab 24. In one embodiment, illustrated in FIGS. 5A and 5B, the face portion 76 has a diameter substantially equal to a diameter of the central panel 20 of the end closure 16. In another embodiment, not illustrated, the face portion 76 has a diameter substantially equal to a diameter of the end closure 16.

Figure 5C:
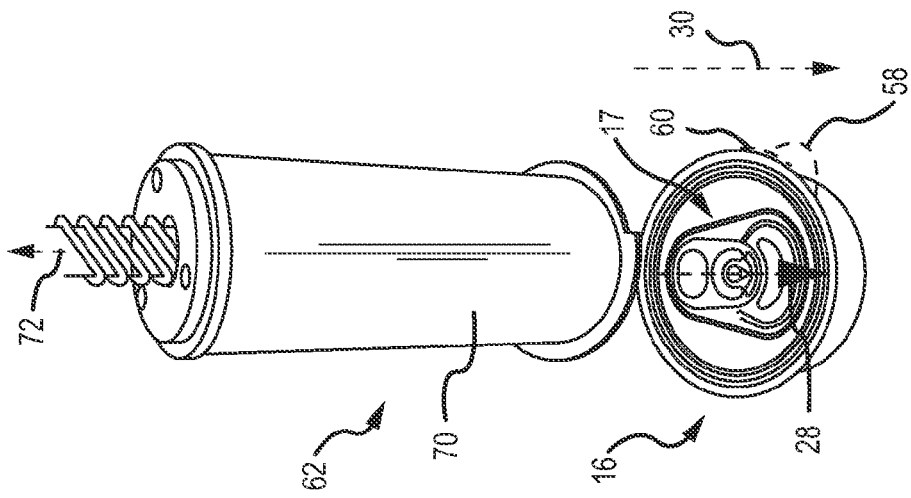
FIGS. 5A-5C depict a method of orienting an end closure with an orientation head according to one embodiment of the present invention.
Figure 5B:
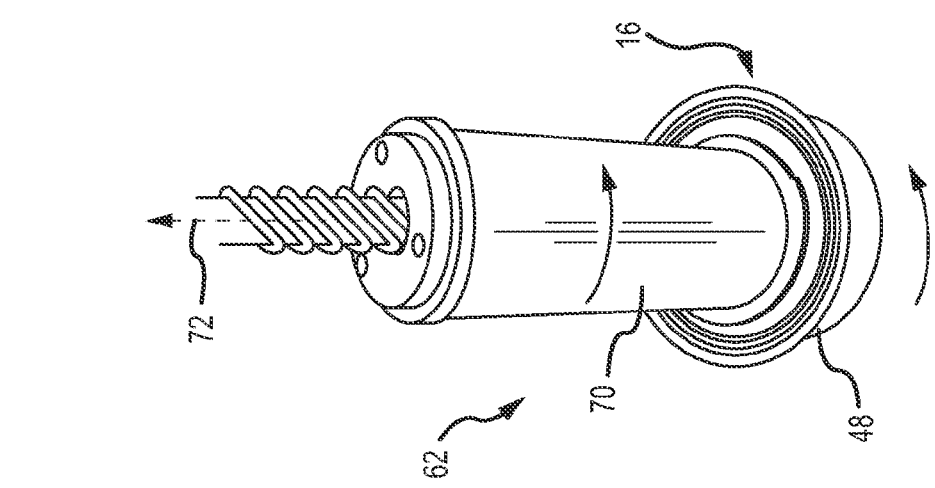
Figure 5A:
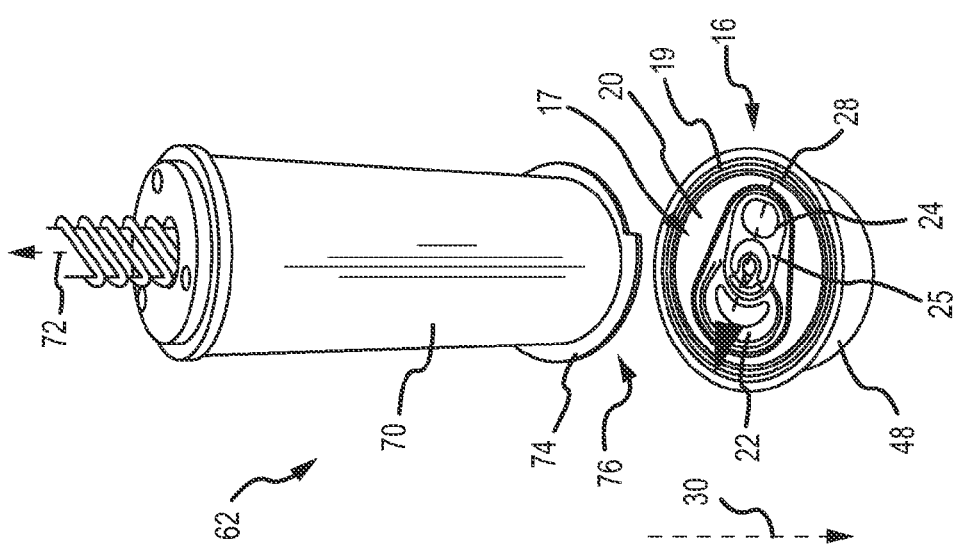

Referring now to FIGS. 5A-5C, an end closure 16 is rotated into a preferred orientation by an orientation head 62 in a number of successive operations. As shown in FIG. 5A, the end closure 16 is positioned on a die cap 48 with a pull tab 24 facing away from the die cap. A Y-axis 28 of the end closure 16 is positioned at a random angle with respect to a reference axis 30. The end closure 16 is moved to a position where a vertical axis of the end closure is substantially co-linear with a longitudinal axis 72 of an orientation head 62.

A face portion 76 of the orientation head 62 is moved into contact with an exterior surface of the pull tab 24, as illustrated in FIG. 5B. A small top force is applied to the end closure 16 by the orientation head 62. Contact between the orientation head 62 and the pull tab 24 is utilized to rotate the Y-axis 28 of end closure 16 into a preferred orientation with respect to the reference axis 30. More specifically, after contacting the end closure 16, the orientation head 62 rotates about the longitudinal axis 72. The orientation head 62 rotates in a direction that allows the pull tab 24 to move from contacting the face portion 76 up into the pocket 80. The face portion 76 of the orientation head 62 slides along the pull tab 24 until the pull tab 24 reaches the tapered portion 78 formed in the face portion 76. The orientation head 62 continues rotating and moves closer to the exterior surface of the central panel 20 as the pull tab 24 slides along the tapered portion 78 and into the pocket 80. As the orientation head 62 continues to rotate, a side surface 25 of the pull tab 24 contacts the wall 82, retaining the pull tab 24 in the pocket 80. The orientation head 62 continues to rotate and the wall 82 applies a force to the side surface 25 of the pull tab 24, rotating the end closure 16 and the die cap 48 simultaneously. The force applied by the orientation head 62 is sufficient to rotate the end closure 16 and the die cap 48 without the pull tab 24 spinning freely on the end closure 16. Although FIG. 5B illustrates the orientation head 62 and the end closure 16 rotating counter-clockwise, the orientation head 62 may rotate clockwise if the position of the tapered portion 78 and the wall 82 are reversed on the face portion 76 of the orientation head 62.

Referring now to FIG. 5C, the orientation head 62 stops rotating after about one rotation around the longitudinal axis 72. Regardless of the starting orientation of the Y-axis 28, one rotation of the orientation head 62 is generally sufficient to rotate the Y-axis 28 of the end closure 16 into a predetermined alignment with the reference axis 30. However, in one embodiment, the orientation head 62 may rotate up to two times around the longitudinal axis 72. In another embodiment, the orientation head 62 may make up to three rotations around the longitudinal axis 72.

When the predetermined number of rotations of the orientation head 62 is complete, the orientation head 62 is moved away from the end closure 16. The Y-axis 28 of the end closure 16 is substantially parallel with the reference axis 30. In one embodiment, an angle between the Y-axis 28 and the reference axis 30 is less than about 5°. In a more preferred embodiment, the angle between the Y-axis 28 and the reference axis 30 is less than about 2°. In a still more preferred embodiment, the angle between the Y-axis 28 and the reference axis 30 is less than about 1°.

In one embodiment, as the orientation head 62 rotates, the end closure 16 spins freely on the die cap 48 while the die cap remains stationary. In another embodiment, the die cap 48 rotates the end closure 16 while the orientation head 62 remains substantially stationary. In this embodiment, the wall 82 of the orientation head 62 is aligned substantially parallel to the reference axis 30. When the side surface 25 of the pull tab 24 contacts the wall 82, the end closure 16 stops rotating and spins freely on the die cap. Said another way, the orientation head does not rotate around the longitudinal axis as the end closure is rotated into the predetermined alignment. In one embodiment, the holder 26 or the die cap 48 are adapted to rotate the end closure around the longitudinal axis. The face portion 76 of the orientation head 62 is moved into contact with an exterior surface of the pull tab 24, as illustrated in FIG. 5B. A small top force is applied to the end closure 16 by the orientation head 62. The holder or the die cap 48 rotate the end closure in a direction that allows the pull tab 24 to move from contacting the face portion 76 of the orientation head 62 up into the pocket 80. The pull tab 24 of the end closure slides along the face portion 76 of the orientation head 62 until the pull tab 24 reaches the tapered portion 78 formed in the face portion 76. The end closure continues rotating and the face portion 76 moves closer to the exterior surface of the central panel 20 as the pull tab 24 slides along the tapered portion 78 and into the pocket 80. As the end closure continues to rotate, a side surface 25 of the pull tab 24 contacts the wall 82, retaining the pull tab 24 in the pocket 80. The orientation head 62 continues to rotate and the wall 82 of the pocket 80 applies a force to the side surface 25 of the pull tab 24, preventing further rotation of the end closure 16. The force applied by the orientation head 62 is sufficient to prevent further rotation of the end closure without the pull tab 24 spinning freely on the end closure 16. In one embodiment, the end closure may spin freely on the holder 26 or the die cap 48 when the pull tab 24 is engaged in the pocket 80. In another embodiment, the holder or the die cap 48 are adapted to stop rotating when the wall 82 of the pocket 80 applies the force to the pull tab 24.

After the end closure 16 is rotated to a predetermined orientation, the holders 26 are operable to prevent further rotation of the end closures 16 by any means known to those of skill in the art. In one embodiment, a clamping mechanism 32 interconnected to the holder 26, illustrated in FIG. 1, applies a force to the end closure 16 to prevent unintended rotation of the end closure 16. In one embodiment, the clamping mechanism 32 comprises a single bar that is moved into contact with all of the end closures 16 in the holder 26. In another embodiment, the holders 26 include a matching contour friction clamp 32 or a multipoint circumferential contact clamp 32 to prevent unintended movement of the end closures 14. In another embodiment, the holders 26 apply a suction force to a surface of the end closure to prevent unintended rotation of the end closures 14. Optionally, a clamp 58 with a pressure applying end 60 may be interconnected to the die cap 48 to prevent rotation of the end closure 16 after the Y-axis 28 is positioned substantially parallel to the reference axis 30. The end 60 is adapted to contact and apply enough force to the end closure 16 to prevent rotation of the end closure 16. In one embodiment, the end 60 moves to apply force to the end closure 16 before the orientation head 62 is moved from contact with the end closure. In another embodiment, a suction force is applied to an interior surface of the end closure 16 through an aperture 56 in the die cap 48 to prevent further rotation of the end closure 16 after the Y-axis 28 is aligned with the reference axis 30.

Referring again to FIG. 1, the Y-axis 28 of all the end closures 16 are substantially parallel to each other when the holder 26 exits the orientor 6 at point B. In one embodiment, the orientor 6 rotates each end closure 16 until the Y-axis 28 is substantially parallel to the reference axis 30 of the system 2 and the tear panel 22 is positioned to the right of the pull tab 24, as viewed in FIG. 1. Although the reference axis 30 is generally horizontal as seen in FIG. 1, it will be appreciated that the reference axis can be aligned at any desired angle. For example, in one embodiment of the present invention, the reference axis is rotated 180° and all of the end closures 16 are oriented with their pull tabs 24 exiting the orientor 6 before the tear panels 22. In another embodiment, the reference axis is rotated 90° clockwise and all of the end closures 16 exit the orientor 6 with the pull-tab 24 oriented towards the top of FIG. 1. In yet another embodiment, the reference axis is rotated 90° counter-clockwise and all of the end closures 16 exit the orientor 6 with the pull-tab 24 oriented towards the bottom of FIG. 1. The orientation of the reference axis 30 may be selected by an operator and may be adjusted to any desired angle.

After the end closures 16 are aligned into an oriented position by the orientor 6, a clamping mechanism 32 prevents inadvertent and unintended movement of the end closures 16 as they are transported through the system 2 by the holders 26. Maintaining the orientation of the end closures is necessary to add decorations to the desired locations on the end closures 16. If the end closures are allowed to rotate out of the desired oriented position, any decorations may be applied to undesired areas, such as on the pull tab or on scored areas. The clamping mechanism 32 may be actuated by a cam mechanism positioned in the path of the holders 26 through the system 2.

In one embodiment, the clamping mechanism 32 is interconnected to the holder 26 and contacts and applies a force to a side surface of the oriented end closure 16. The clamping mechanism 32 can include a pivoting arm, a fastener, a gripping device, a rod, a bar, a hold, a pneumatic device that creates suction, and/or combinations thereof or any other means known by those of skill in the art to prevent inadvertent and unintended movement or rotation of the end closures 16. In one embodiment, the clamping mechanism 32 prevents movement of the oriented end closures 16 by applying a force to an inside panel wall or an outside curl diameter. In another embodiment, the clamping mechanism 32 physically engages a portion of the oriented end closures to maintain the preferred orientation.

In one embodiment, the clamping mechanism 32 is similar to the clamp 58 illustrated in FIG. 2. The clamping mechanism can include an end similar to the end 60 that rotates to contact and apply pressure to a surface of the end closures 16. In one embodiment, the clamping mechanism 32 applies pressure to a side surface of the end closures 16. In another embodiment, the clamping mechanism 32 applies pressure to a top surface of the end closures. In yet another embodiment, the clamping mechanism 32 applies pressure to an outer circumference of the end closures 16. The pivot point of the clamping mechanism 32 can be moved to increase the force applied by the end. In one embodiment, the end has an arcuate shape with a radius of curvature approximately equal to a radius of curvature of an exterior surface of an end closure 16.

The holders 26 with the oriented end closures 16 next enter the coater 8. Optionally, the coater 8 can pre-treat the exterior surface of the end closures 16. In one embodiment, the pretreatment is a corona surface treatment, or air plasma treatment, that uses a low temperature corona discharge plasma to change the surface properties of the end closures 16. In another embodiment, one or more of a corona surface treatment, flame plasma treatment, chemical plasma treatment, electroplating, electrostatic plating, chemical coating, anodic oxidation, hot dipping, and thermal spraying may be performed to pre-treat the exterior surface of the end closures 16. The pretreatment generally improves adhesion and bonding between a base coating applied by the coater 8 and the exterior surface of the end closure 16.

The coater 8 applies a base coating material to the exterior surface of the end closures 16. The base coating material generally improves the appearance of colored inks that are applied by the printer 10. The base coating material may be an ink, adhesive, or lacquer of any desired color. In one embodiment, the base coating material is a photosensitive compound that can be cured with ultra violet light. In one embodiment, a white base case coating material is applied to the end closures 16. In another embodiment, a clear base coating material is applied to the end closures 16. However, as will be understood by one of skill in the art, base coatings of any desired color may be applied by the coater 8. Additionally, more than one coating can be applied to the end closures. For example, in one embodiment, the system 2 includes two or more coaters 8 that each apply a different base coating or a base coating of a different color.

The coater 8 includes a drum 34 that is positioned above the path of the holders 26 through the system 2. The drum 34 can rotate about an axis that is substantially perpendicular to the reference axis 30 of the system 2. The drum 34 has radial section that matches the pitch or frequency of the holders 26 moving through the system 2.

Offset printing blankets 36 are attached in rows 37 that run around an exterior circumference of the drum 34. The number of rows 37 of blankets is equal to the number of end closures 16 in each holder 26. Printing blankets of any size, thickness, or material may be used. If necessary, the printing blankets 36 may be cut to fit the end closures. The number and positions of the printing blankets 36 can be altered depending on the size of the end closures 16 and the number of end closures in each holder 26. In one embodiment, the printing blankets 36 have an adhesive backing that is used to interconnect the blankets 36 to the drum 34. However, it will be understood that any suitable means may be used to interconnect the blankets 36 to the drum.

The diameter of the drum 34 can be increased or decreased to match the pitch of the holders 26 and to adjust the quality and amount of coating applied by the coater 8. For example, if the distance between each holder 26 is increased, the diameter of the drum 34 can be increased to ensure proper alignment between the printing blankets and the end closures 16.

The drum 34 rotates at a rate determined to match the frequency or pitch of the holders 26 moving through the system. In one embodiment, the drum 34 has a gear 35 to engage the chain 27 to control the drum's rate of rotation. The drum 34 is synchronized so that the gear 35 engages the chain 27 to initiate contact with the end closures 16 at a fixed location. The gear 35 sets the application of the coating in a controlled location on the end closures 16 and ensure runtime phenomena such as stretching of the chain 27 do not degrade the quality of the coating or improper placement of the coating. The synchronization of the coater 8 and the holders 26 is monitored and may be corrected by a computer. In one embodiment, when the computer detects an end closure is not properly seated in the holder 26 or that a holder 26 is not synchronized with the coater 8, the computer can raise the drum 34 of the coater 8 to prevent contact between the blankets 36 and end closures 16. The end closures will then pass through the system 2 without receiving coatings and decorations and will be rejected when they reach the inspection station 45 and separated from properly decorated end closures.

Because the central panel 20 is generally recessed and is lower than the peripheral curl 19, as illustrated in FIG. 3, the printing blankets 36 generally protrude from a circumference of the drum 34. The printing blankets 36 generally only contact portions of the end closures 16 that require coatings. To prevent contact between the printing blankets 36 and portions of the end closures 16 that will not be decorated, recesses 38 may be formed in the printing blankets 36. In one embodiment, the recesses 38 are sized to align with the pull tabs 24 and prevent contact between the pull tabs 24 and the blankets 36 during the application of coatings. The size and shape of the recesses 38 can be adjusted for various features such as larger pull tabs, vents, or other features on the exterior surface of the end closures. In one embodiment of the present invention, the recesses 38 have a shape that corresponds to the shape of the pull tabs 24 of the end closures 16. In another embodiment, the recesses 38 have a depth at least equal to the height of the exterior surface of the tab 24 above the exterior surface 17 of the end closure. Optionally, the recesses 38 can include a shape corresponding to the shape of the tear panels 22 as illustrated in FIG. 1. However, it should be understood that the printing blankets can include areas that contact and apply coatings to the tear panels 22 and to the pull tabs 24. Although only one recess 38 is illustrated in each printing blanket 36, it will be understood that more than one recess may be formed in each printing blanket 36. Further, one of skill in the art will recognize that the size and shape of the printing blankets 36 and recess 38 can be tuned or adjusted to apply coatings only in one or more predetermined areas of each end closure.

As the holders 26 with the oriented end closures 16 move through the coater 8, the drum 34 rotates about an axis substantially perpendicular to the reference axis 30. The base coating material is applied to each printing blanket 36 by an application roller 40. The application roller 40 is operable to transfer the base coating to predetermined portions of each printing blanket 36. The location, size, shape, and amount of base coating transferred to each printing blanket 36 can be adjusted to conserve the base coating material and to match the decoration that will be applied to the end closure by the printer 10.

After receiving the base coating material from the application roller 40, the drum 34 continues to rotate and brings each printing blanket 36 into contact with an end closure. The printing blankets 36 protrude at least partially into the end closures 16 and make contact with a predetermined portion of the exterior surface of the end closures 16. The height of the drum 34 above the holders 26 can be adjusted higher or lower to increase or decrease the amount of pressure the printing blankets 36 apply to the end closures 16.

The holder 26 continues to a curer 12 that cures the base coating with an ultra violet light source. However, the curer 12 may also cure the base coating using any method known to those skilled in the art, including thermal curing and infra-red curing. In one embodiment, the ultra violet light of the curer 12 is produced by light emitting diodes (LEDs). In another embodiment, the ultra violet light is produced by mercury-vapor lamps.

Next, the holders 26 transport the end closures 16 to the printer 10. The printer includes a drum 34A that is the same as or similar to the drum 34 of the coater 8. The drum 34A is positioned above the path of the holders 26 and rotates above an axis substantially perpendicular to the reference axis 30 of the system 2. The diameter of the drum can be increased or decreased to match the pitch of holders 26 moving through the system 2.

Printing blankets 36A are attached in rows 37 to an exterior circumference of the drum 34A and protrude from the surface of the drum 34A. The printing blankets 36A can be of any size, shape, or thickness and can include one or more recesses 38A as discussed above. The recesses 38A can have the same size and shape of the recesses 38 attached to the drum 34 of the coater 8. Optionally, the printing blankets 36A can have a different shape than the printing blankets 36. The distance between the holders 26 and the drum 34A can be adjusted to increase or decrease the pressure the blankets 36A apply to each end closure 16.

As the drum 34A rotates, each printing blanket 36A contacts up to six different print heads 42. Images are formed on predetermined portions of each print head 42. Each print head 42 may have a different image, or portion of an image, formed thereon. Additionally, each print head 42 may have images formed in rows that correspond to the rows 37 of the drum 34A. In this manner, the print heads 42 may transfer different images to each row 37 of printing blankets 36A attached to the drum 34A.

Inkers 44 transfer ink to the print heads 42. Each inker 44 applies a single color of ink to the image of each print head 42. As the drum 34A rotates, each of the print heads 42 contacts a printing blanket 36A and transfers its image and particular color of ink to the printing blanket. The recesses 38A do not receive ink. When all of the print heads 42 have transferred their ink colors and images to the printing blankets 36A, a final lithographic image is formed on the printing blankets 36A. The printing blankets 36A then continue to rotate until they contact and transfer the lithographic image to the predetermined portion of the exterior surface of the end closures 16. The recess 38A formed in the printing blanket 36A prevent contact between printing blanket 36A and portions of the end closures 16 that will not be decorated. In one embodiment, the recess 38A has a shape that prevents contact between the printing blanket 36A and the pull tab 24 and other features and structures of the end closure 16 that will not be decorated. In another embodiment, the recess 38A has a shape that prevents contract between the printing blanket 36A and a first portion of the pull tab 24 and the printing blanket 36A transfers the lithographic image to a second portion of the pull tab 24.

The method of offset printing can be varied to use any number of colors. As will be appreciated by one of skill in the art, any type of ink may used with the present invention. In one embodiment, the inks are UV curable. In another embodiment, the inks are powders or pastes. In another embodiment, specialty inks of any type may be used to decorate the end closures. Various type of specialty inks are described in U.S. patent application Ser. No. 14/686,517, which is incorporated herein by reference in its entirety.

Any method may be used to form the images on the print heads 42 and the printing blankets 36A to form a high resolution lithographic image for transfer to the end closures. Optionally, one or more printing blankets 36A interconnected to the drum 34A of the printer 10 may have a different image formed thereon to transfer a different image to the end closures. For example, in one embodiment, the image formed on the printing blankets of row 37A may be different than the image formed on the printing blankets of row 37D. Further, the printing blankets 36A in row 37A may have a different recess 38A than the printing blankets in row 37D. In addition, the printing blankets 36A may be comprised of soft photo-polymer plates or soft secondary plates with images formed thereon, as described in U.S. patent application Ser. No. 14/301,018 and U.S. patent application Ser. No. 14/686,517, which is incorporated herein by reference in its entirety. Optionally, an image may also be formed on each printing blanket 36A. For example, the printing blankets 36A may include etched or engraved portions that do not receive ink to form multiple images from a single set of printing blankets, as described in International Patent Publication No. WO 2014/008544, which is herein incorporated by reference in its entirety.

The holder 26 next enters a second curer 12A that is operable to cure the decoration applied to the end closures 16. The second curer 12A uses an ultra violet light source to cure the inks of the decoration. Optionally, the second curer 12A may use a heat source to cure the decoration as will be appreciated by one of skill in the art.

Optionally, an overcoat material may be applied by a second coater 8A. The second coater 8A is the same as or similar to the coater 8 described above. The overcoat material is used to enhance the appearance of the decoration applied to the end closure 16 and to protect the decoration from the environment and from contact with other objects. The overcoat material is applied by the second coater 8A in the same manner as the base coat material. In one embodiment, the overcoat material is a clear coating. Optionally, the second coater 8A may be a second printer 10A. The second printer 10A can apply a second decoration to the end closures 16 or apply different coatings and colors to the decoration applied by the first printer 10. If the optional overcoat material or a second decoration are applied, the coating or decoration is cured in a third curer 12B using an ultra violet light source or a heat source.

The holders 26 may optionally transport the decorated end closures 16 to an inspection station 45 to ensure the decoration has been applied to the intended location of the end closures 16. The inspection station 45 can also determine if the decoration meets a predetermined quality. In one embodiment, the inspection station 45 includes a camera for each end closure 16 positioned in the holder 26. However, it will be understood by those of skill in the art that the inspection station may include any means known by those of skill in the art to ensure the location and the quality of the decoration meet or exceed predetermined quality criteria. End closures that pass the inspection are separated from the end closures that do not pass the inspection and are collected separately.

After the holders 26 exit the curer 12A or 12B at point C, the end closures 16 are transferred to the collector 14 where each decorated end closure is bagged and prepared for shipment to a bottler or for storage. A blast of air may be directed through an aperture 56 of the die cap 48 to move the end closures 16 to the collector 14. In one embodiment, as the chain 27 reaches point C, the chain 27 rotates around a roller. The holders 26 rotate out of a generally horizontal position and the end closures fall out of the holders 26.

When the end closures 16 are removed from the holders 26 at point C, the holders 26 cycle back to receive another group of unoriented end closures 16 from the balancer 4 at point A. The end closures 16 remain in the holders 26 as the holders move from the balancer 4 until the end closures are removed at the collector 14.

Optionally, the system may include a mandrel and tools for embossing, debossing, and/or engraving the exterior surface of the end closures 16. In one embodiment, the tools comprise rollers with contact surfaces with a shape predetermined to form a raised or embossed profile or indicia onto one or more portions of the end closures 16. The system 2 may further comprise tools, such as an abrasive tool, polisher, or grinder, to selectively remove coatings and/or ink from a predetermined exterior surface portion of the embossed profile formed on the end closure 16 to produce an end closure 16 with a bare metal embossed decoration. Optionally, the bare metal embossed decoration can be decorated with coatings by the coater 8, printer 10, and/or the second coater 8A. In one embodiment, the embossing tools of the system 2 form an embossed profile or indicia on the end closures 16 before coatings or decorations are applied to the end closures 16.

An example of a decorated end closure 16B is also illustrated in FIG. 1. The end closure 16B includes a first image 46A positioned in a predetermined portion of the central panel 20. A second image 46B of an arrow points toward the secondary vent 23 formed on the central panel 20. A third image 46C of a recycle indicator is formed on the tear panel 22. Because the end closure 16B was oriented by the orientor 6 before being decorated, the images 46 are located in predetermined areas of the end closure 16B that are not obstructed by the pull tab 24, the secondary vent 23, or other structures of the end closure. It will be appreciated that images 46 may be formed at any location on the end closure, including the tear panel 22 and the pull tab 24. Further, the images 46 may include text, customer identification information, branding information, directions of use (for example, the arrow 46B) or any other desired decoration or indicia.

The system 2 can orient and decorate approximately 2,000 end closures at 16 per minute. In one embodiment, the system can orient and decorate approximately 1,000,000 end closures in 8 hours. The printer 10 can form images 46 using up to six different colors or types of ink with a resolution of 133 lines per inch.

Figure 6:
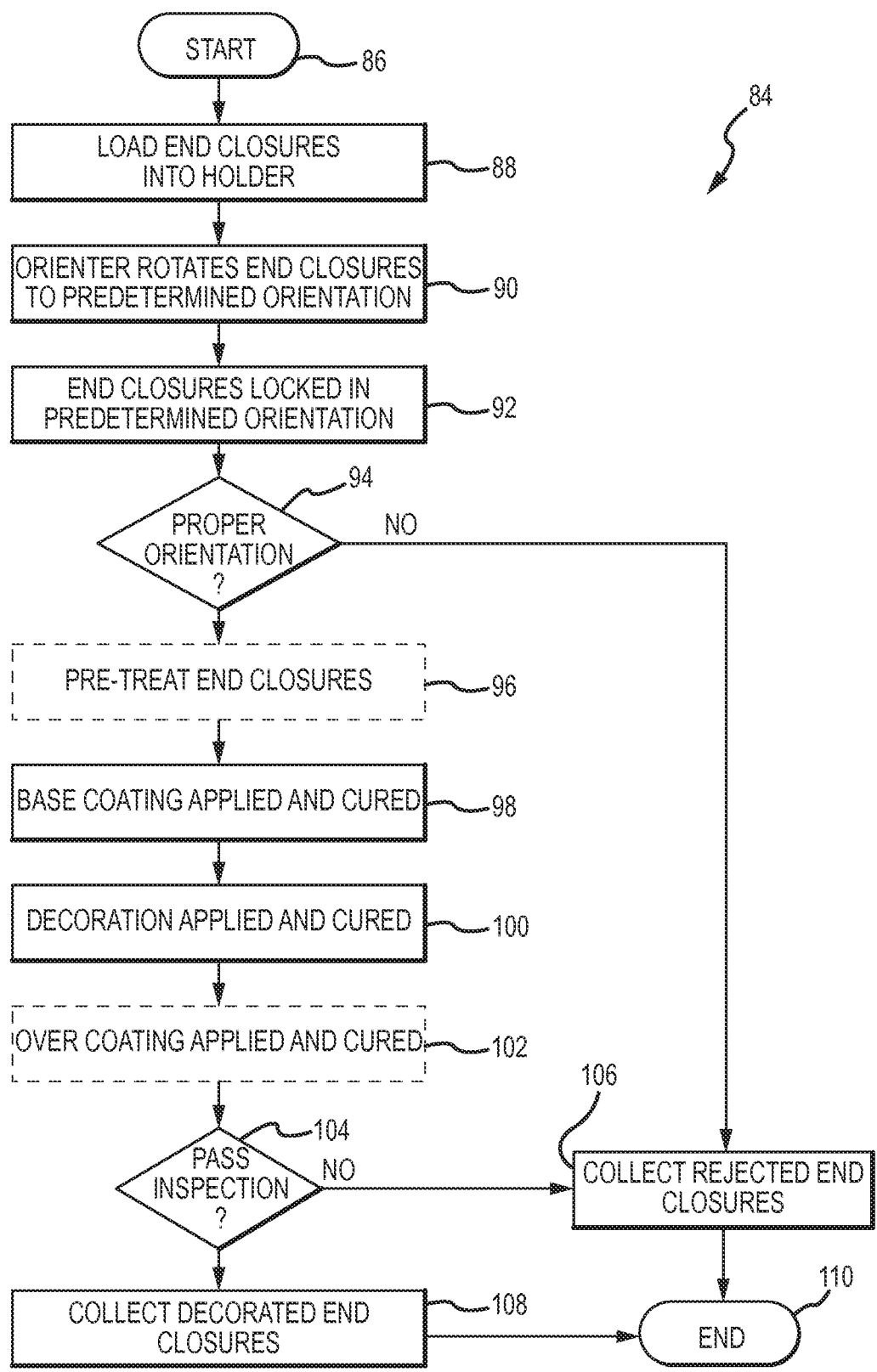
FIG. 6 is a process diagram of a method of orienting and decorating end closures according to one embodiment of the present invention.

Referring now to FIG. 6, an embodiment of a method 84 for orienting and decorating end closures 16 is illustrated. While a general order of the method 84 is shown in FIG. 6, the method 84 can include more or fewer steps, or can arrange the order of the steps differently than those shown in FIG. 6. Generally, the method 84 starts with a start operation 86 and ends with an end operation 110. Hereinafter, the method 84 shall be explained with reference to the apparatus 2 described in conjunction with FIGS. 1-5.

A balancer 4 loads 88 converted end closures 16 into a holder 26. Optionally, the end closures 16 can be positioned on a die cap 48. The holder 26 transports the end closures 16 into an orientor 6. The orientor 6 rotates 90 the end closures 16 to a predetermined orientation. The end closures 16 are locked 92 in the predetermined orientation by a clamping mechanism 32. Optionally, a clamp 58 interconnected to the die cap 48 may lock the end closures 16 in the predetermined orientation. Additionally, the end closures 16 may be locked in the predetermined orientation by a suction force applied through an aperture 56 of the die cap 48.

The end closures 16 are inspected 94 to determine if the end closures 16 are in the predetermined orientation. If the end closures 16 are not in the predetermined orientation, method 84 proceeds NO and the rejected end closures 16 are collected 106. If the end closures 16 are in the predetermined orientation, method 84 proceeds YES and the end closures 16 are optionally pre-treated 96.

The holder 26 transports the end closures 16 to a coater 8 and a curer 12 that are operable to apply and cure 98 base coatings to predetermined areas of the end closures 16. The holder 26 then transports 100 the end closures 16 to a printer 10 and a second curer 12A. The printer 10 is operable to apply a decoration to one or more predetermined areas of the end closures 16. Optionally, the decorator can apply different decorations to each of the end closures positioned in the holder 26. The second curer 12A is operable to cure the decoration applied to the end closures 16 by the printer 10. Optionally, an over coating may be applied 102 to the end closures 16 by a second coater 8A and cured by a third curer 12B.

The end closures 16 are then inspected 104 to ensure the decoration is in a proper location and quality. If the end closures 16 do not pass the inspection 104, the method 84 proceeds NO and the rejected end closures 16 are collected 106. If the end closures 16 pass the inspection 104, the method 84 proceeds YES and the end closures are collected 108 by the collector 14. The method 84 then ends 110.

Figure 7:
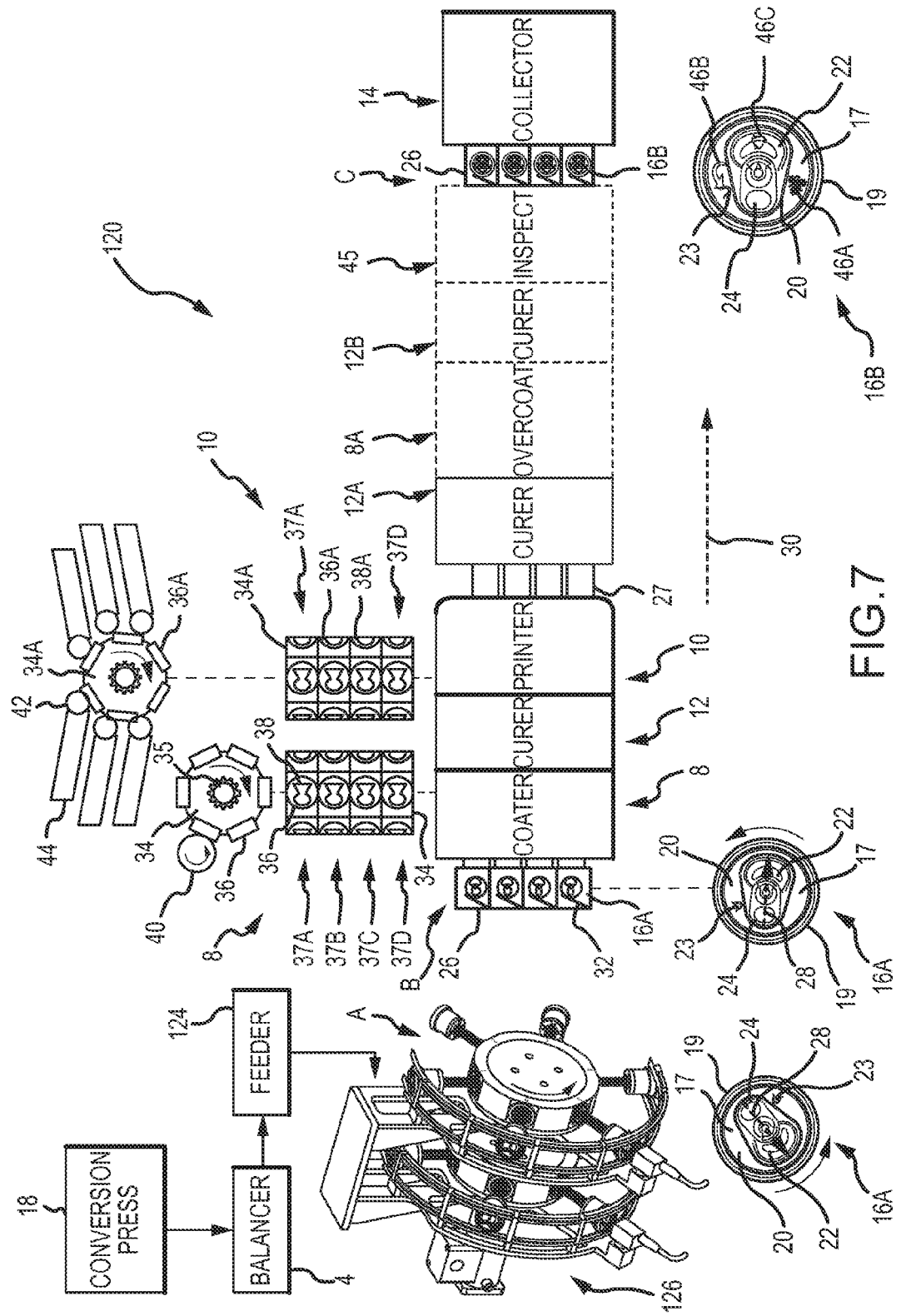
FIG. 7 is a schematic flow diagram of another embodiment of a system of the present invention operable to orient and decorate end closures.

Referring now to FIG. 7, another embodiment of a system 120 of the present invention for orienting and decorating a predetermined location of an end closure is illustrated. The system 120 is similar to system 2 and generally includes a balancer 4, a feeder 124, an orientor 126, a coater 8, a printer 10, a curer 12, and a collector 14. In one embodiment of the present invention, the balancer 4, coater 8, printer 10, curer 12, and collector 14 are the same as, or similar to, the balancer, coater, printer, curer, and collector described above in conjunction with FIG. 1.

Orienting the end closures is beneficial to ensure the decoration is located at a predetermined location of the end closure. In one embodiment, in order for the blankets 36, 36A of the coater 8 and printer 10 of systems 2, 120 to decorate the exterior surface 17 of the end closures without the raised tab 24 of the end closure interfering with the decorating process of the system 120, the end closures are rotated to a predetermined orientation. The blankets 36, 36A of systems 2, 120 include recesses 38, 38A to receive the tab 24 and to prevent the tab from contacting the print surface of the blankets 36, 36A. Accordingly, the raised portions of the end closures, such as the tab 24, projecting from the exterior surface 17 of the end closure 16, must be oriented to fit within the recesses 38, 38A. In addition to avoiding interference of the tab 24 with the blankets 36, 36A, the tab 24 of the end closure 16 must be in a predictable location to create substantially uniform print locations based on the design of the decoration. The accuracy of the tab location is known as registration. Registration of end closures is directly related to having a predetermination location of the end closure selected for decoration in a known or predictable location. The orientors 6, 126 of the present invention facilitate accurate registration of end closures. In another embodiment of the present invention, the end closure is oriented in order for a laser of the printer 10 to form indicia on one or more predetermined location of the exterior surface of the end closure. Orienting the end closures is also beneficial when decorating end closures without tabs. For example, an end closure without a tab may be oriented to ensure decorations are located in predetermined portions of the end closure to avoid other portions of the end closure. The other portions of the end closure may include scores, embossing, rivets, tear panels, vents, and other structures that would interfere with, or degrade, the decoration.

In one embodiment of the present invention, the balancer 4 receives the converted end closures 16 from the conversion press 18. The end closures 16 are then transported to the feeder 124. In one embodiment of the present invention, a plurality of end closures 16 are transported to the feeder 124 in a cylindrical stack or "stick" format to the feeder 124.

The feeder 124 is operable to separate the plurality of end closures from the stick into individual end closures 16. The feeder 124 generally includes two counter rotating discs and a guide track. Each disc includes a groove with a helical shape formed around a circumferential edge. The groove of the discs wrap around the circumferential edge in opposite directions similar to a first screw with a right-hand thread and a second screw with a left-hand thread. The grooves have the same number of wraps around the discs. The pitch of the groove of each of the two discs is substantially identical.

In one embodiment, the rotating discs of the feeder 124 are spaced apart a distance approximately equal to a diameter of the end closure. In this manner, two points approximately 180° apart on the exterior edge or peripheral curl 19 of an end closure are contacted by the rotating discs. As the discs rotate, one end closure at a time is captured by a start of each groove and lifted from the stick. The rate of rotation of the discs is synchronized so that the groove of each disc lifts each end closure in a substantially planar orientation between the discs.

After a predetermined number of rotations of the discs, the end closure reaches an end of each groove at substantially the same time. The end closure then enters the guide track. The end closures remain in single file in the guide track. In one embodiment, the guide track includes a twist to feed the end closures into the orientor 126 with the exterior surface 17 including the tab 24 proximate to the orientation heads 62 of the orientor 126.

The feeder 124 then provides the individual end closures 16 to the orientor 126. The Y-axis 28 of the end closures 16 is generally randomly oriented with respect to the reference axis 30 of the system 120 when the end closures are received by the orientor 126. Further, the Y-axis 28 of an end closure 16 may not be parallel to the Y-axis of another end closure. The orientor 126 is operable to receive the unoriented end closures 16 and rotate them to a predetermined orientation with respect to the reference axis 30 of the system 120.

Figure 8:
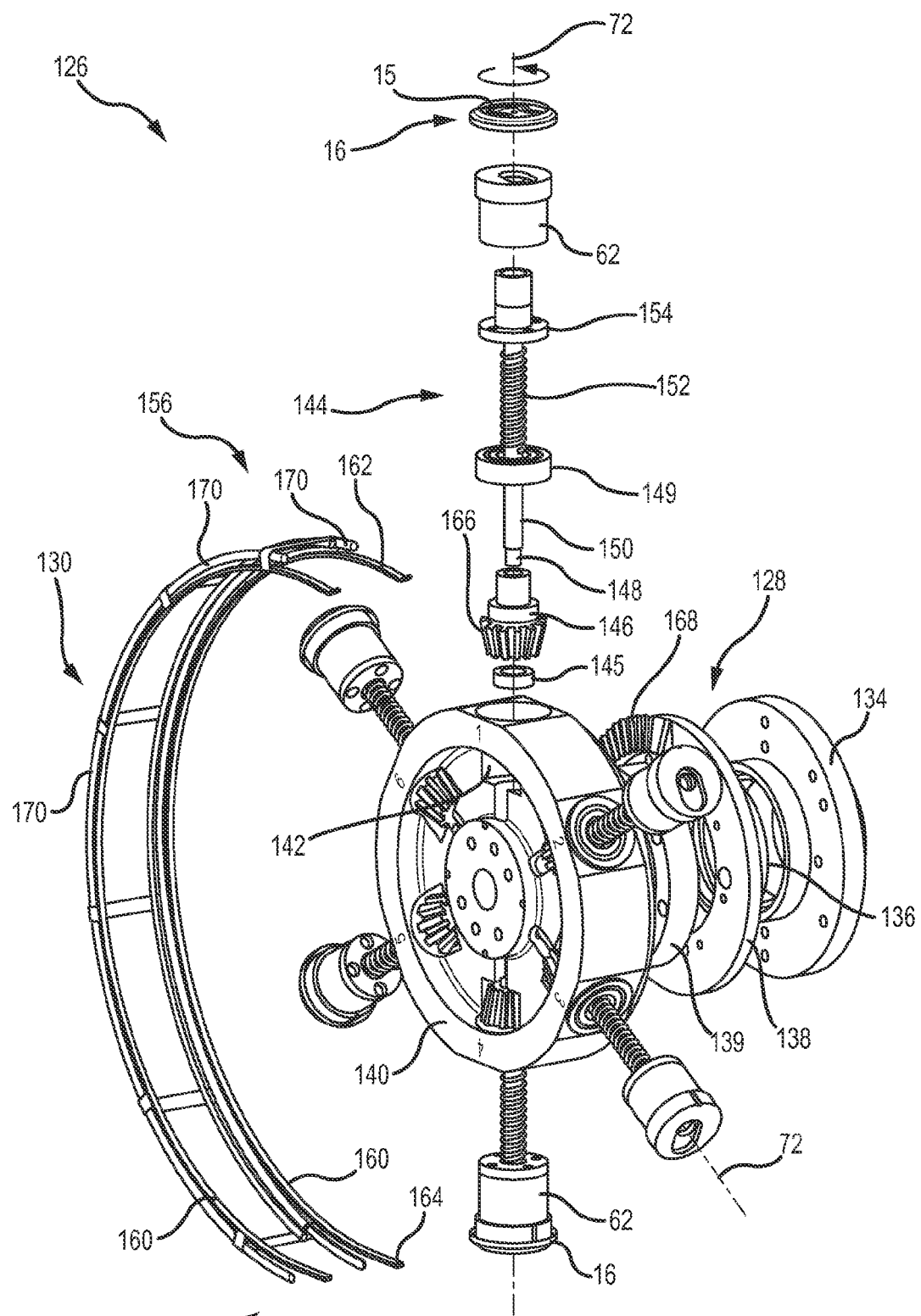
FIG. 8 is an exploded perspective view of an orientor of an embodiment of the present invention.

Referring now to FIGS. 8-10, an embodiment of the orientor 126 of the present invention is illustrated. The orientor 126 generally comprises a wheel 128, end closure effectors or orientation heads 62 interconnected to the wheel, a motor 129 operable to rotate the wheel 128, a guide assembly 130, and a mount 132. The mount 132 is adapted to keep the other components of the orientor 126 in a predetermined alignment. The orientation heads 62 are the same as, or similar to, the orientation heads 62 described above in conjunction with FIGS. 4-5. Optionally, in one embodiment of the present invention, the orientor 126 may include orientation heads 62A, described below in conjunction with FIG. 13. In one embodiment of the present invention, the orientation heads 62 are rotatably interconnected to the wheel 128. In another embodiment of the present invention, the orientation heads 62 are aligned in a predetermined orientation and do not rotate as the wheel rotates.

Figure 10A:
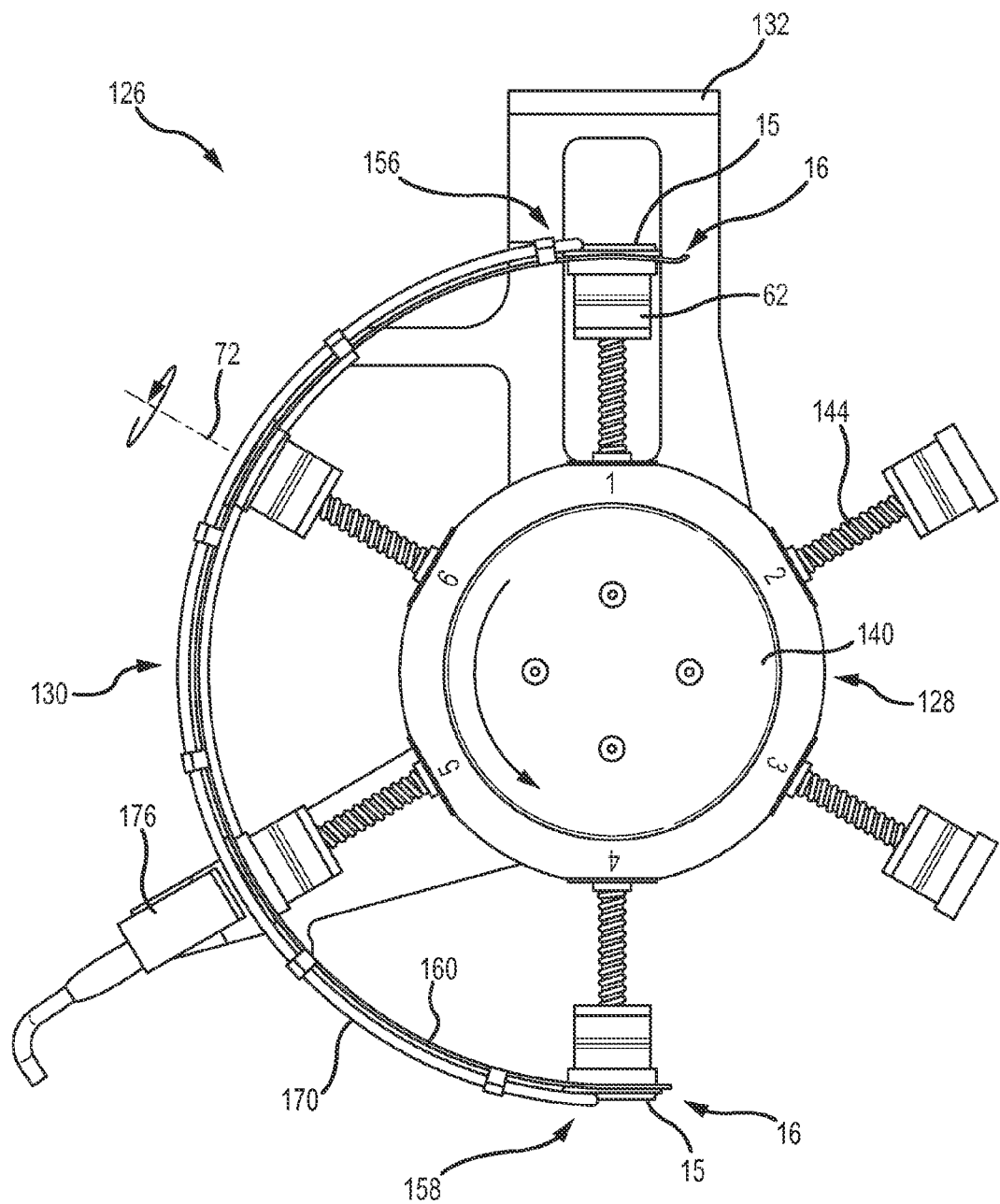
FIG. 10A is another front elevation view of a wheel and guide assembly of the orientor of FIG. 8 interconnected to a mount and further illustrating a sensor associated with the orientor.
Figure 10B:
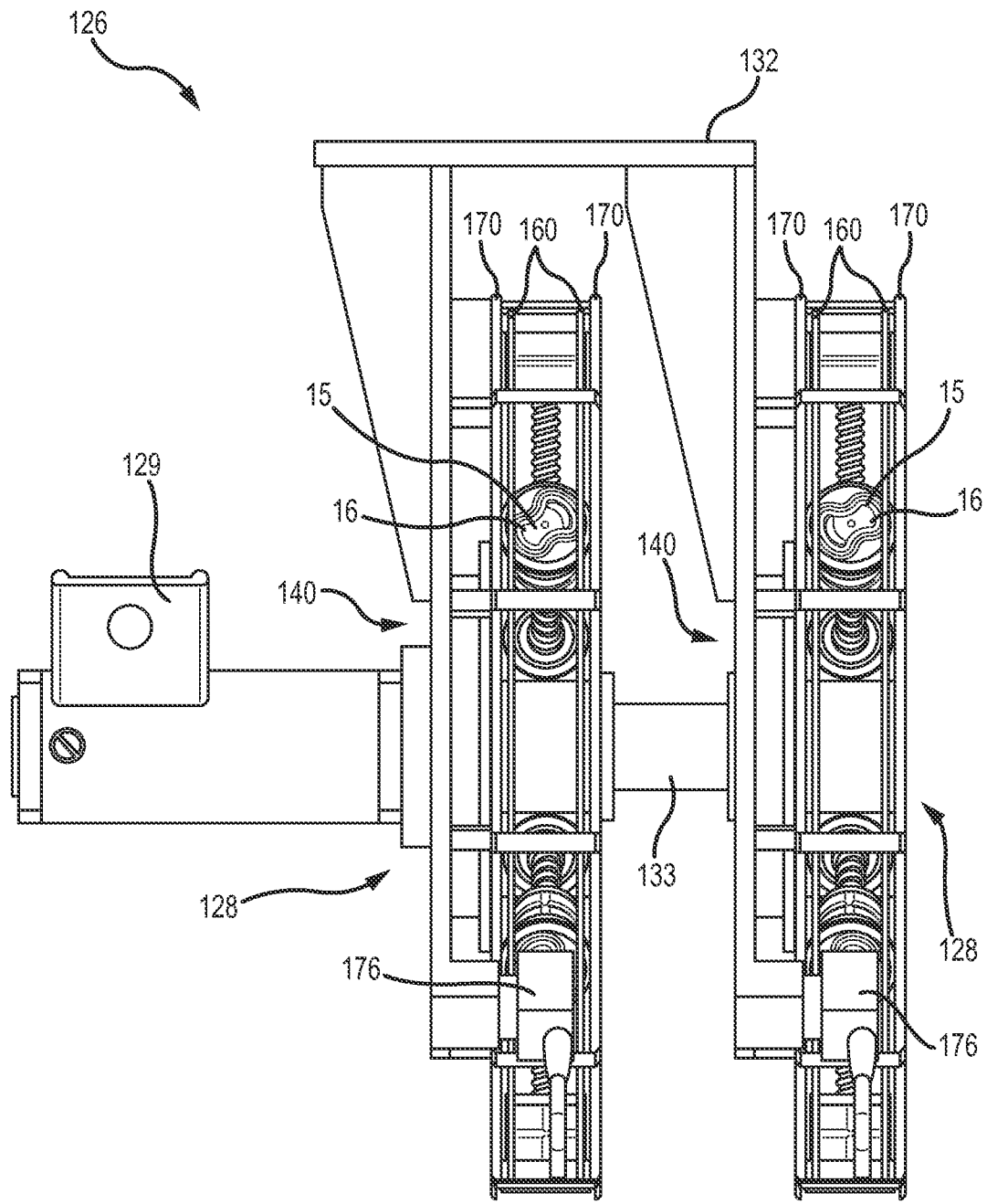
FIG. 10B is a side elevation view of the wheel and guide assembly of FIG. 10A and further illustrating two wheels of the orientor interconnected axially to the mount and further illustrating a motor of the orientor.

The motor 129, illustrated in FIG. 10B, is operably associated with one or more wheels 128. The motor 129 is capable of providing a force to rotate the wheels at a predetermined rate. In one embodiment, the motor 129 may receive a signal from a controller (not illustrated) of the system 120 to change the rate of rotation of the wheels. For example, the controller may send a signal to the motor 129 to start, stop, or change the rate of rotation of the wheels 128. In one embodiment of the present invention, the motor 129 is interconnected to the wheels 128 by an axle 133.

The wheels 128 generally comprise a mounting plate 134, a bearing 136, a bevel gear 138, an anti-rotation guide 139, a hub 140, and spokes 144. The spokes 144 are interconnected to the hub 140. In one embodiment of the present invention, each wheel 128 includes six spokes 144. However, it will be appreciated by one of skill in the art that the number of spokes on each wheel 128 may be changed to adjust the rate of operation of the orientor 126. In one embodiment of the present invention, each wheel has from three to twelve spokes. In another embodiment, each wheel has five spokes. In one embodiment of the present invention, the hub 140 includes apertures 142 adapted to receive a portion of the spokes 144. However, one of skill in the art will appreciate that the spokes may be interconnected to the hub 140 in a variety of different ways.

In one embodiment of the present invention, the spokes 144 comprise a bearing 145, a pinion 146, a first axle 148, a pinion bearing 149, a second axle 150, a tension spring 152, and a linear spline assembly 154. An orientation head 62 is interconnected to each linear spline assembly 154. In one embodiment of the present invention, each spoke has a fixed length extending from the hub 140. In another embodiment of the present invention, the length of each spoke 144 is variable. The linear spline assembly 154 and the orientation head 62 interconnected thereto are biased to a radially extended position distally from the hub 140 by the tension spring 152. Accordingly, the orientation head 62 interconnected to each spoke 144 may rotate around the wheel 128 at a variable radius. In one embodiment, the orientation heads 62 rotate in a cam like profile around the wheel 128. Thus, at least a portion of the rotational path of the orientation heads 62 may be substantially linear instead of having a continuous arcuate path throughout its 360° rotation around the wheel 128.

In one embodiment of the present invention, an aperture is formed axially in at least a portion of the second axle 150. The first axle 148 is substantially concentric with the aperture and the first axle 148 has an exterior diameter less than the internal diameter of the aperture of the second shaft. Accordingly, the first axle 148 may at least partially slide into the aperture of the second axle 150. The tension spring 152 applies a predetermined biasing force to the spline assembly 154 to move the second axle 150 to a predetermined position in relation to the first axle 148. The linear spline assembly 154 and the orientation head 62 interconnected thereto are thus biased by the tension spring 152 to a position radially extended from the hub 140.

In one embodiment of the present invention, at least a portion of each spoke 144 is operable to rotate around a longitudinal spoke axis 72. In one embodiment of the present invention, the entire spoke 144 rotates around the longitudinal axis 72. In another embodiment, only a portion of the spoke 144 rotates around the longitudinal axis. For example, in one embodiment of the present, at least the linear spline assembly 154 and the orientation head 62 interconnected thereto rotate around the spoke's longitudinal axis 72. The orientation heads 62 may rotate in either direction around the longitudinal axis 72.

The guide assembly 130 is adapted to bring the exterior surface portion 17 of the end closures 16 into contact with an orientation head 62 of the orientor 126. The guide assembly may have a variety of shapes. In one embodiment, the guide assembly has a generally arcuate shape that substantially matches a portion of the rotational arc of the orientation heads 62 interconnected to the spokes 144. The guide assembly may include a variety of devices and means for engaging and supporting an end closure. The guide assembly generally comprises a first end 156 and a second end 158. End closures 16 are received at the first end 156 from the guide track of the feeder 124. In one embodiment, the single file of end closures in the guide track are aligned substantially with the direction of rotation of the orientation heads 62 at the first end.

The guide assembly is adapted to allow the end closures to rotate around the longitudinal axis 72 of the spokes 144. In one embodiment, the end closures are rotated about the longitudinal spoke axis 72 as the orientation heads 62 rotate. In another embodiment of the present invention, the end closures rotate around the longitudinal spoke axis 72 and the orientation heads do not rotate around the longitudinal spoke axis. The end closures 16 are positioned in the guide assembly by the feeder 124 with an interior surface portion 15 facing radially outward away from the orientation heads. Accordingly, when the end closures 16 are positioned in the guide assembly 130, the exterior surface portion 17 and the tab 24 of each end closure faces radially inward proximate to the orientation heads 62 of the orientor 126. When the end closures 16 enter the first end 156 of the guide assembly 130, the Y-axis 28 (illustrated in FIG. 7) of each end closure 16 is randomly oriented with respect to the reference axis 30 of the system 120.

In one embodiment, the guide assembly 130 has a generally uniform radius of curvature. In another embodiment of the present invention, the radius of curvature of the guide assembly 130 varies along the arcuate length of the guide assembly 130. In another embodiment of the present invention, a portion of the guide assembly 130 contacts a portion of the orientation head 62 interconnected to each spoke 144. The contact compresses the spring 152 and moves the orientation head 62 and linear spline assembly 154 radially inwardly.

The guide assembly 130 includes means for engaging and supporting the end closure. The means for engaging and supporting may comprise any structure or structures for receiving and end closure and supporting the end closure as the end closure is rotated to align the end closure in a predetermined orientation. In one embodiment of the present invention, the means for engaging and supporting comprises a least one inner rail 160 and at least one outer rail 170. The inner and outer rails 160, 170 are separated by a predetermined distance selected to retain the exterior surface of the end closure in contact with the orientation head as the orientation head rotates the end closure around the longitudinal axis 72 and moves the end closure from the first end 156 to the second end 158 of the guide assembly. In one embodiment, the inner and outer rails 16, 170 are separated by a distance approximately equal to the height of an end closure. In another embodiment, the means for engaging and supporting comprises two inner rails and two outer rails; however, one of skill in the art will appreciate that any number of inner and outer rails may be used with the guide assembly of the present invention. In still another embodiment of the present invention, the inner rails 160 include extensions 162 that project circumferentially beyond the outer rails 170 at the first end 156 of the guide assembly. The extensions 162 are adapted to receive individual end closures 16 from the feeder 124 and hold the end closure until engaged by an orientation head 62. The extensions 162 are also adapted to contact a portion of the orientation head 62 and move the orientation head 62 radially inward. In still another embodiment, the inner rails 160 include extensions 164 at the second end of the guide assembly 130.

The means for engaging and supporting may also include a means for reducing friction between the means for engaging and supporting and the end closure. The means for reducing friction may include, but are not limited to, bearings, ball bearings, rollers, wheels, non-stick surfaces, lubricant, and any other suitable structure, device, or composition for reducing friction.

As each spoke 144 rotates with the hub 140, the orientation head 62 interconnected to the spoke moves to a position proximate to the first end 156 of the guide assembly. The orientation head 62 engages an unoriented end closure 16 at the first end. The spoke continues to rotate the orientation head 62 toward the second end 158 of the guide assembly, capturing the end closure in the guide assembly. In one embodiment of the present invention, the radius of curvature of the guide assembly 130 decreases between the first end 156 and the second end 158. Accordingly, because each orientation head 62 is biased to a radially extended position, each orientation head 62 applies a predetermined radial force to the exterior face portion 17 of the engaged end closure 16 as the orientation head and the end closure rotate from the first end 156 to the second end 158.

In one embodiment of the present invention, as the orientation head 62 moves from the first end 156 to the second end 158, the orientation head 62 rotates the engaged end closure 16 to a predetermined orientation, in a manner similar the operation of the orientation heads described above in conjunction with FIGS. 5A-5C. More specifically, each orientation head 62 has a geometry adapted to locate and engage a feature on the exterior surface portion 17 of the end closures 16. In one embodiment, the exterior surface feature is a pull tab 24 interconnected to the exterior surface 17 of the end closure 16. In another embodiment, the exterior surface feature is a tear panel 22 of the end closure 16. In still another embodiment, the exterior surface feature is a central panel 20 of the end closure. In yet another embodiment, the exterior surface feature is a rivet that interconnects the pull tab 24 to the central panel 20. In still another embodiment, the exterior surface feature is a debossed area formed in the central panel 20. In another embodiment, the exterior surface feature is a score formed on the end closure 16.

After contacting an end closure 16, an orientation head 62 rotates until the exterior surface feature is engaged. In one embodiment of the present invention, a face portion 54 of the orientation head 16 slides across the pull tab 24 of the end closure 16. When a pocket 80 formed in the face portion 76 of the orientation head 62 aligns with the pull tab 24, the orientation head moves radially outward closer to the exterior surface 17 of the end closure, and the tab 24 is received in the pocket 80. The orientation head 62 continues to rotate and an edge 82 of the pocket 80 applies a force to the side surface 25 (illustrated in FIG. 5A) of the pull tab 24, rotating the end closure 16 and the pull tab 24 simultaneously. The force applied by the orientation head 62 is sufficient to rotate the end closure 16 without the pull tab 24 spinning freely on the end closure 16.

To orient the end closures 16, the orientation heads 62 rotate a predetermined number of revolutions around the longitudinal axis 72 of each spoke. The orientation heads 62 may rotate one or more times around the longitudinal axis of the spoke. Regardless of the starting orientation of the Y-axis 28 of an end closure 16, one rotation of the orientation head 62 around the longitudinal axis 72 as the spoke 144 moves between the first end 156 and the second end 158 of the guide assembly 130 is generally sufficient to rotate the Y-axis 28 of the end closure 16 into a predetermined alignment with the reference axis 30 of the system 120. However, in one embodiment, the orientation head 62 may rotate up to two times around the longitudinal axis 72. In another embodiment, the orientation head 62 may make up to three rotations around the longitudinal axis 72.

In one embodiment of the present invention, the orientation heads 62 rotate around the longitudinal axis 72 substantially continuously as the wheel 128 rotates. In another embodiment, the orientation heads 62 are adapted to rotate during a predetermined portion of each rotation of the wheel 128. In one embodiment, each orientation head 62 begins rotating proximate to the first end 156 of the guide assembly 130. Each orientation head 62 stops rotating proximate to the second end 158 of the guide assembly. In another embodiment, each orientation head stops rotating before the orientation head 62 is proximate to the second end 158. For example, in one embodiment of the present invention, each orientation head 62 is adapted to begin rotating when the orientation head 62 is proximate to the first end 156. After the orientation head 62 rotates a predetermined number of revolutions around the spoke longitudinal axis 72, the orientation head 62 stops rotating before the orientation head is proximate to the second end 158. In one embodiment, each orientation head 62 is adapted to stop rotating after the spoke has rotated between approximately 120° to approximately 180° from the first end 156 toward the second end 158 of the guide assembly. In another embodiment, each orientation head 62 stops rotating after the spoke has rotated between approximately 135° and approximately 165°. In a more preferred embodiment, each orientation head 62 stops rotating after the spoke has rotated between approximately 145° to approximately 155° from the first end 156 of the guide assembly. In a still more preferred embodiment of the present invention, each orientation head 62 stops rotating when the spoke has rotated approximately 150° from the first end 156.

In one embodiment of the present invention (illustrated in FIG. 8), teeth 166 of the pinion 146 of each spoke engage with teeth 168 formed on the bevel gear 138 during at least a portion of the rotation of the hub 140. The engagement between the teeth 166 of the pinion 146 and the teeth 168 of the bevel gear 138 transmits a force to the spoke causing at least the linear spline assembly 154 and the orientation head 62 to rotate around the longitudinal axis 72. In one embodiment of the present invention, the bevel gear teeth 168 are formed on only a portion of an axial surface of bevel gear 138. In another embodiment, the teeth are formed on 360° of the axial surface of the bevel gear 138.

In one embodiment of the present invention, contact between the orientation head 62 and the guide assembly 130 proximate to the first end 156 moves at least a portion of the pinion 146 radially inwardly. As the pinion 146 moves radially inward, the pinion teeth 166 engage with the bevel gear teeth 168 and the orientation head 62 begins to rotate around the longitudinal axis 72. At a predetermined point before the second end 158 of the guide assembly, the radius of curvature of the guide assembly increases. When the orientation head 62 rotates along the guide assembly to the predetermined point, the orientation head 62 and the pinion 146 move radially outwardly. As the pinion 146 moves outwardly, the pinion teeth 166 lose engagement with the bevel gear teeth 168 and the orientation head 62 stops rotating around the longitudinal axis 72.

In one embodiment of the present invention, the guide assembly 130 includes means to rotate the orientation head. In one embodiment, a portion of at least one of the linear spline assembly and the orientation head contacts a stationary rail 172 (illustrated in FIG. 9A) associated with the guide assembly 130. The contact between the rail 172 and the linear spline assembly and/or the orientation head causes the orientation head 62 to rotate around the spoke's longitudinal axis a predetermined number of revolutions. When the spoke 144 rotates past the end 174 of the rail 172 the orientation head 62 stops rotating. In one embodiment of the present invention, the rail 172 is interconnected to one of the two inner rails 160. In another embodiment, the rail 172 is interconnected to one of the two outer rails 170. In still another embodiment, the rail 172 is interconnected to the mount 132.

In still another embodiment of the present invention, the orientation head 62 is adapted to remain in a predetermined orientation with respect to the reference axis 30 of the system 120. The end closure 16 rotates around the longitudinal spoke axis 72 until the orientation head 62 stops the rotation of the end closure when the end closure is in substantial alignment with the reference axis 30 of the system 120. In one embodiment, for at least a portion of the movement of the end closure from the first end 156 to the second end 158, a predetermined portion of the end closure contacts a stationary structure of the orientor 126. The contact between the end closure and the stationary structure is adapted to rotate the end closure around the longitudinal spoke axis 72 as the orientation head contacts the exterior face portion 17 of the end closure 16. In one embodiment, the predetermined structure is a friction rail similar to rail 172. In another embodiment, one or more of inner and outer rails 160, 170 are adapted to apply a frictional force sufficient to rotate the end closure. In still another embodiment, a drive roller or a motion belt of the orientor 126 are adapted to rotate the end closure.

The face portion 76 of the orientation head is adapted to allow the end closure to rotate until a predetermined feature on the exterior surface portion 17 of the end closure is engaged by the orientation head. When the orientation head engages the predetermined feature of the end closure, the orientation head applies a force to the end closure sufficient to prevent further rotation of the end closure. In this manner, because the orientation head is in a predetermined orientation with respect to the reference axis 30 of the system 120, when the orientation head stops the rotation of the end closure, the end closure is in the predetermined orientation. In one embodiment of the present invention, the end closure rotates until the pull tab 24 is aligned with, and engaged in, the pocket 80 formed in the orientation head 16.

Referring now to FIG. 10A, the orientor 126 may include one or more sensors 176. The sensors are adapted to provide data to a controller that is operable to determine the orientation of the end closures 16. If the controller determines the Y-axis 28 of an end closure is not in a predetermined orientation, the controller is operable to send a signal to orientor 126 and the improperly oriented end closure is rejected and prevented from proceeding through the system 120. In one embodiment of the present invention, the sensors 176 are positioned to sense the interior surface portion 15 of the end closures. In another embodiment of the present invention, the sensors 176 are positioned to sense the orientation of the end closures while the end closures are engaged by the orientation heads 62 and retained by the guide assembly 130. In one embodiment of the present invention, the sensors 176 comprise high speed cameras.

Referring now to FIG. 11, holders 26 are synchronized with the spoke spacing of the wheels 128 of the orientor 126. When the orientation head 62 and the oriented end closure 16 reach the second end 158 of the guide assembly 130, the end closure 16 is received by the holder 26. In one embodiment, as the orientation head 62 moves past the guide assembly, the orientation head 62 extends radially to apply a predetermined force to the end closure to seat the end closure on a holder 26. The orientation head 62 continues to rotate with the hub 140, releasing the oriented end closure 16 and returning to an axially extended position.

The holders 26 are adapted to prevent inadvertent or unintended rotation of the oriented end closures. In one embodiment, protrusions 178 are formed on the holders 26. Friction between each protrusion 178 and the interior surface of an end closure prevents inadvertent rotation of the end closure. In another embodiment, a clamping mechanism 32 interconnected to the holder 26, illustrated in FIG. 7, applies a force to the end closure 16 to prevent unintended rotation of the end closure 16. In one embodiment, the clamping mechanism 32 comprises at least one bar that is moved into contact with all of the end closures 16 in the holder 26. In another embodiment, the holders 26 include a matching contour friction clamp 32 or a multipoint circumferential contact clamp 32 to prevent unintended movement of the end closures 14. In another embodiment, the holders 26 apply a suction force to a surface of the end closure to prevent unintended rotation of the end closures 14.

The orientor may have any number of wheels and guide assemblies in any combination. For example, as illustrated in FIG. 11, the orientor 126 may comprise four wheels and guide assemblies positioned in two staggered rows. Alternatively, as illustrated in FIG. 7, the orientor 126 may have two wheels and guide assemblies in one row.

Referring again to FIG. 7, the Y-axis 28 of all the end closures are substantially parallel to each other when the holder exits the orientor 126 at point B. The Y-axis 28 may have any predetermined orientation with respect to the reference axis 30 of the system 120. In one embodiment, the Y-axis 28 of each end closures 16 is substantially parallel with the reference axis 30 of the system 120 when each end closure is placed on the holder by the orientation head 62. In another embodiment, an angle between the Y-axis 28 and the reference axis 30 is less than about 5°. In a more preferred embodiment, the angle between the Y-axis 28 and the reference axis 30 is less than about 2°. In a still more preferred embodiment, the angle between the Y-axis 28 and the reference axis 30 is less than about 1°. In one embodiment, the orientor 126 rotates each end closure 16 until the Y-axis 28 is substantially parallel to the reference axis 30 of the system 120 and the tear panel 22 is positioned to the right of the pull tab 24, as viewed in FIG. 7. Although the reference axis 30 is generally horizontal as seen in FIG. 7, it will be appreciated that the reference axis can be aligned at any desired angle. For example, in one embodiment of the present invention, the reference axis is rotated 180° and all of the end closures 16 are oriented with their pull tabs 24 exiting the orientor 126 proximate to Point B before the tear panels 22. In another embodiment, the reference axis is rotated 90° clockwise and all of the end closures 16 exit the orientor 126 with the pull-tab 24 oriented towards the top of FIG. 7. In yet another embodiment, the reference axis is rotated 90° counter-clockwise and all of the end closures 16 exit the orientor 126 with the pull-tab 24 oriented towards the bottom of FIG. 7. The orientation of the reference axis 30 may be selected by an operator and may be adjusted to any desired angle.

The holders 26 with the oriented end closures next enter the coater 8 of the system 120. The coater 8 is operable to pre-treat the exterior surface 17 of the end closures 16 as described above in conjunction with FIG. 1. The coater 8 may also apply a base coating material of any predetermined type to the exterior surface 17 of the end closures 16.

The holders 26 continue to the curer 12 of the system 120. The curer 12 is substantially the same as the curer of system 2, described above. The curer 12 cures the base coating, if any, that is applied to the end closures by the coater 8.

The end closures are next transported to the printer 10 of system 120 by the holders 26. The printer 10 is operable to decorate the exterior surface 17 of the end closure with a preferred indicia. In one embodiment of the present invention, the printer comprises a laser marking unit operable to form an image of a predetermined size, shape, and orientation on the exterior surface of the end closure.

In another embodiment of the present invention, the printer includes a drum 34A that is the same as or similar to the drum 34A of the printer 10 of system 2. The drum 34A includes printing blankets 36A with recesses 38A as described above in conjunction with FIG. 1. In one embodiment of the present invention, the printer 10 can form images 46 using up to six different colors or types of ink with a resolution of 133 lines per inch.

After being decorated by the printer 10, the end closure may optionally enter a second curer 12A to cure the decoration applied to the end closure. An overcoat material may be applied to the end closures by a second coater 8A. The end closures may receive another curing by a third curer 12B. Optionally, the holders 26 may transport the end closures to an inspection station 45. The inspection station 45 includes sensors that are operable to ensure the decoration has been applied to the intended location of the end closures. The inspection station 45 is also operable to determine if the decoration meets a predetermined quality. The inspection station 45 may send and receive signals from the controller of the system 120. The inspection station may include any means known to one of skill in the art to ensure the location and the quality of the decoration meet or exceed predetermined quality criteria. End closures that do not pass the inspection by the inspection station 45 are rejected and separated from the end closures that pass the inspection. In one embodiment of the present invention, the printer 10 can form images 46 using up to six different colors or types of ink with a resolution of 133 lines per inch. In one embodiment of the present invention, the system 120 can orient and decorate approximately 2,000 end closures per minute. In another embodiment, the system can orient and decorate approximately 1,000,000 end closures in an 8 hour period.

After the holders 26 exit the curer 12A or 12B proximate to Point C, the end closures 16 are transferred to the collector 14. The end closures are separated from the holders 26 as described above with respect to FIG. 1. The empty holders 26 then cycle back to Point A proximate to the orientor 126 to receive more oriented end closures from the orientor 126.

FIG. 7 also includes an example of an end closure 16B of one embodiment decorated by system 120. The end closure 16B is substantially the same as the end closure 16B described above with respect to FIG. 1. One or more images 46 may be positioned in a variety of predetermined portions of the exterior surface 17 of the end closure, including on the central panels, the tear panel, and the tab 24.

Figure 12A:
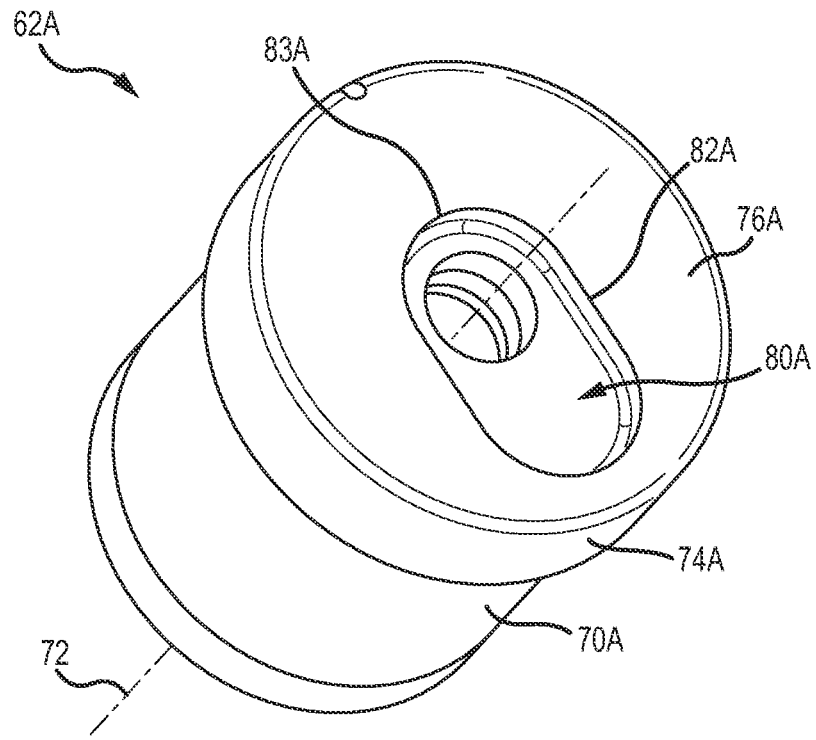
FIGS. 12A and 12B are two perspective views of an orientation head of an embodiment of the present invention.
Figure 12B:
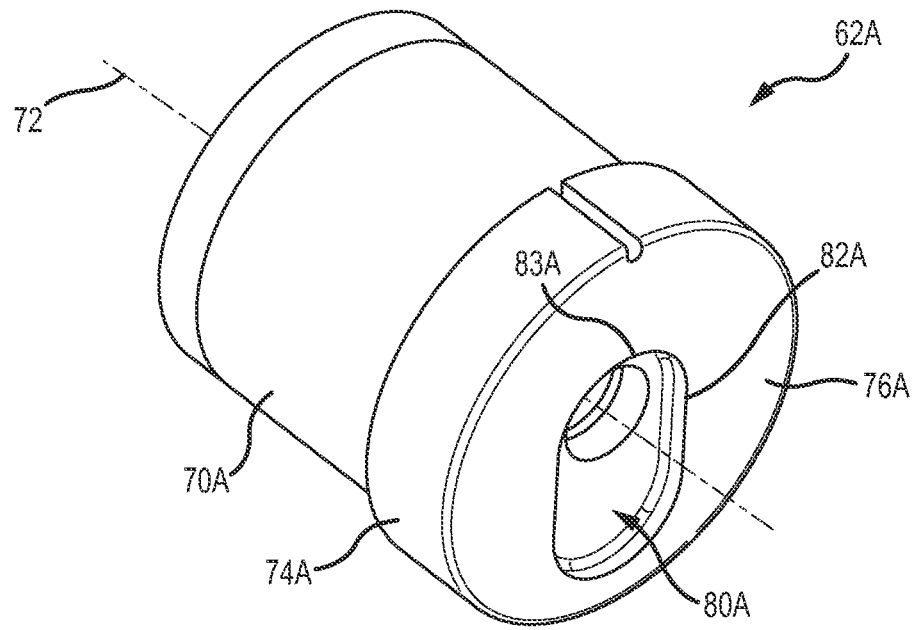

Referring now to FIG. 12, another embodiment of an orientation head 62A of the present invention is illustrated. The orientation head 62A is adapted for use with both orientor 6 and orientor 126. The orientation head 62A has a body 70A that is adapted to be interconnected to the orientor 6 or a linear spline assembly 154 of a spoke 144 of orientor 126. In one embodiment, the body 70A has a generally cylindrical shape. The body 70A has a head 74A. In one embodiment, the head 74A has a diameter greater than the diameter of the body 70A. In another embodiment, the head 74A has the same or similar diameter as the body 70A. In yet another embodiment, the head 74A has a diameter that is less than the diameter of the body 70A. The head 74A has a face portion 76A that is generally perpendicular to a longitudinal axis 72 of the body 70A. The face portion 76A is adapted to allow an exterior surface of a pull tab 24 of an end closure 16 to slide along the face portion 76A as one of the orientation head 62A and the end closure 16 rotates without applying a rotational force to the pull tab 24. A pocket 80A formed on the face portion 76A is adapted to capture a tab 24 of the end closure. When the tab is aligned with the pocket, the tab is received in the pocket. In one embodiment in which the orientation head is adapted to rotate the end closure, when the tab is received in the pocket, a portion of the pocket 80A applies a force to the tab 24 to rotate the tab and the end closure 16 simultaneously to a predetermined orientation. For example, in one embodiment, a wall 82A of the pocket 80A applies the force to the tab 24 to rotate the end closure. In another embodiment of the present invention in which the orientation head does not rotate around the longitudinal spoke axis, when the tab is received in the pocket, a portion of the pocket 80A, such as, for example, the wall 82A, applies a force to the tab 24 to prevent further rotation of the end closure.

In one embodiment, the pocket 80A is recessed into the face portion 76A toward the body 70A. The pocket 80A is adapted to receive the pull tab 24 when the pull tab 24 is aligned with the pocket 80A. A wall 82A extends substantially vertically upward from the pocket 80A to the face portion 76A. In one embodiment of the present invention, the wall is continuous around the perimeter of the pocket 80A. The wall 82A is adapted to engage and apply a force to a side surface of the pull tab 24. The pocket 80A may have any predetermined shape and size adapted to receive a pull tab 24. In one embodiment of the present invention, the pocket 80A has a shape substantially corresponding to the shape of a particular size and style of tab 24 of an end closure. In another embodiment of the present invention, the pocket 80A is adapted to receive a variety of tabs 24 of different sizes and shapes. In one embodiment of the present invention, illustrated in FIG. 12, the pocket has generally linear sidewalls 82A with generally arcuate endwalls 83A. In one embodiment of the present invention, the pocket 80A is formed in a portion of the face portion 76 and the pocket does not intersect the exterior circumference of the head 74A. In another embodiment, the pocket 80A at least partially intersects the exterior circumference of the head 74A similar to the pocket 80 illustrated in FIG. 4. In still another embodiment of the present invention, the pocket 80A has a substantially symmetric shape. In another embodiment of the present invention, the pocket 80A has an asymmetric shape.

In one embodiment of the present invention, the pocket 80A has a depth at least equal to a height from the exterior surface 17 of the end closure to the exterior surface of the tab 24. When the tab 24 is received in the pocket 80A of this embodiment of the orientation head, the face portion 76A may contact and apply a force to the exterior surface 17 of the end closure. In another embodiment, the pocket 80A has a depth less than the height of the exterior surface of the tab 24 above the exterior surface 17 of the end closure. Accordingly, in this embodiment, when the tab 24 is received in the pocket of the orientation head, the face portion 76A of the orientation head does not contact the exterior surface 17 of the end closure.

In one embodiment, the face portion 76A of the orientation head 62A has a diameter substantially equal to a diameter of the central panel 20 of the end closure 16. In another embodiment, the face portion 76A has a diameter substantially equal to a diameter of the end closure 16. In still another embodiment of the present invention, the face portion 76A has a diameter greater than a diameter of the end closure 16.

Figure 13:
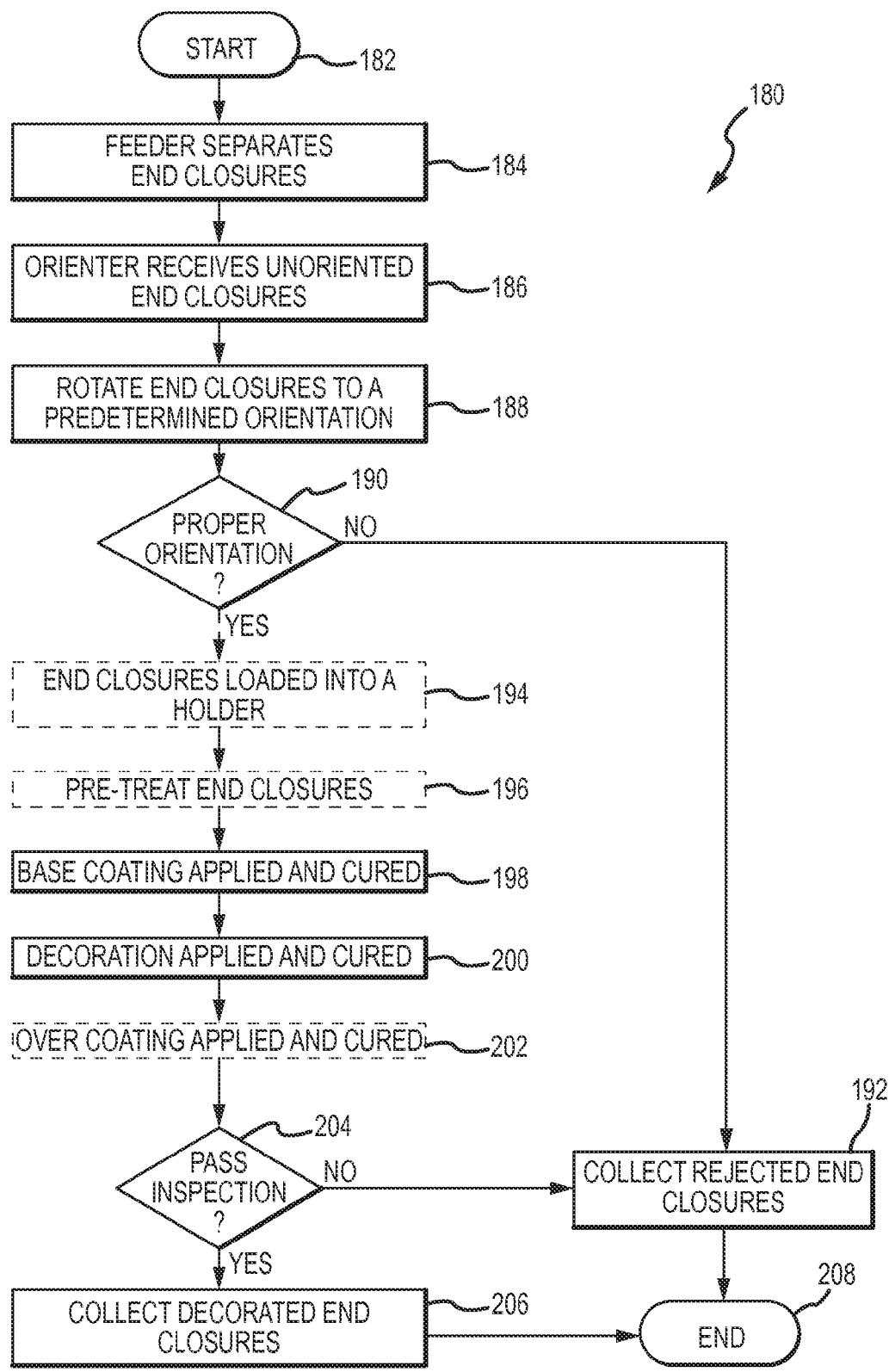
FIG. 13 is a process diagram of a method of orienting and decorating end closures according to an embodiment of the present invention.

Referring now to FIG. 13, an embodiment of a method 180 for orienting and decorating end closures 16 is illustrated. While a general order of the method 180 is shown in FIG. 13, the method 180 can include more or fewer steps, or can arrange the order of the steps differently than those shown in FIG. 13. Generally, the method 180 starts with a start operation 182 and ends with an end operation 208. Hereinafter, the method 180 shall be explained with reference to apparatus 2, 120 and with FIGS. 1-12.

A balancer 4 combines converted end closures 16 into a stick format comprising a plurality of individual end closures. In one embodiment, the end closures include a peripheral curl and a tab interconnected to an exterior surface portion of the end closure. A feeder 124 receives the sticks of end closures and separates 184 individual end closures 16 from the sticks. The orientor 126 receives 186 the individual end closures from the feeder 124. Orientation heads 62 of the orientor 126 contact an exterior surface portion of the end closures. The end closures are rotated 188 by the orientor 126 to a predetermined orientation. In one embodiment, the orientation heads rotate the end closures to the predetermined orientation. In another embodiment, the orientor 126 rotates the end closures and the orientation heads stop the rotation of the end closures when the end closures are in the predetermined orientation.

The end closures 16 are inspected 190 to determine if the end closures 16 are in the predetermined orientation. In one embodiment of the present invention, a sensor 176 associated with each wheel of the orientor senses the end closures. If the end closures 16 are not in the predetermined orientation, method 180 proceeds NO and the rejected end closures 16 are collected 192. If the end closures 16 are in the predetermined orientation, method 180 proceeds YES and the end closures are loaded 194 into a holder 26 by the orientor 126.

The holder 26 is operable to move the oriented end closures through the system 120. Optionally, the end closures are pre-treated 196. The holder 26 may also transport the end closures 16 to one or more of a coater 8 and a curer 12 that are operable to optionally apply and cure 198 base coatings applied to predetermined areas of the exterior surface 17 of the end closures 16. The holder 26 then transports 200 the end closures 16 to a printer 10 and a second curer 12A. The printer 10 is operable to apply a decoration to one or more predetermined areas of the exterior surface 17 of the end closures 16. The decorations may be in any desired location or orientation and can be of any size or shape. Optionally, the decorator can apply different decorations to each of the end closures positioned in the holder 26. The second curer 12A is operable to cure the decoration applied to the end closures 16 by the printer 10. Optionally, an over coating may be applied 202 to the end closures 16 by a second coater 8A and cured by a third curer 12B.

The end closures 16 are then inspected 204 to determine if the decoration is in a proper location and quality. If the end closures 16 do not pass the inspection 204, the method 180 proceeds NO and the rejected end closures 16 are collected 192. If the end closures 16 pass the inspection 204, the method 180 proceeds YES and the end closures are collected 206 by the collector 14. The method 180 then ends 208.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" rt6 or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A method of orienting and decorating an end closure, comprising:
    providing a plurality of end closures which are adapted for interconnection to a neck of a container;
    feeding at least one end closure into a first end of a guide assembly of an orientor;
    engaging an orientation head of the orientor with an exterior surface of the end closure;
    rotating the at least one end closure to align the at least one end closure in a predetermined orientation;
    placing the end closure on a holder proximate to a second end of the guide assembly;
    disengaging the orientation head from the end closure; and
    decorating a predetermined portion of the exterior surface of the end closure with at least one of an image, a laser marking, a code, and a text message while the end closure is held by the holder.

2. The method of claim 1, wherein the guide assembly further comprises an inner rail interconnected to an outer rail, the inner and outer rails separated by a distance approximately equal to a height of the end closure.

3. The method of claim 1, wherein the guide assembly of the orientor has a substantially arcuate shape.

4. The method of claim 1, wherein the orientation head of the orientor is interconnected to a distal end of a spoke, and wherein a proximal end of the spoke is interconnected to a hub of the orientor.

5. The method of claim 4, wherein the spoke is operable to rotate the orientation head around a longitudinal axis of the spoke.

6. The method of claim 5, wherein the spoke is adapted to begin rotating the orientation head at a first point and stop rotating the orientation head at a second point as the hub of the orientor rotates axially.

7. The method of claim 6, wherein the first point is proximate to the first end of the guide assembly and the second point is between the first end and the second end of the guide assembly.

8. The method of claim 6, wherein the spoke further comprises a first gear adapted to engage a bevel gear of the hub, and wherein the first gear and the bevel gear are adapted to initiate rotation of the orientation head at the first point and stop rotation of the orientation head at the second point.

9. The method of claim 4, wherein the orientor is operable to rotate the end closure around a longitudinal axis of the spoke while the orientation head remains aligned with the predetermined orientation, and wherein the orientation head is operable to stop the rotation of the end closure when the end closure is aligned in the predetermined orientation.

10. The method of claim 1, wherein decorating a predetermined portion of the exterior surface of the end closure further comprises:
    providing one or more printing blankets with a recess adapted to receive a pull tab which is interconnected to the exterior surface of the end closure;
    removably affixing the printing blankets onto a drum of a printer;
    forming the image on a print head;
    applying ink to the image;
    transferring the ink from the print head to a predetermined portion of the printing blankets; and
    transferring the ink from the printing blankets to the predetermined portion of the exterior surface of the end closure.

11. An apparatus for receiving and orienting an end closure which is adapted for interconnection to a neck of a container, comprising:
    an arcuate guide assembly comprising a first end and a second end, the first end adapted to receive an end closure and the second end adapted to release the end closure;
    a hub operable to rotate proximate to the arcuate guide assembly at a predetermined rate;
    a plurality of spokes radially interconnected to the hub; and
    an orientation head interconnected to a distal end of each spoke, the orientation head adapted to engage an exterior surface portion of the end closure at the first end of the arcuate guide assembly and align the end closure to a predetermined orientation as the orientation head and the end closure move from the first end to the second end of the arcuate guide assembly.

12. The apparatus of claim 11, wherein the arcuate guide assembly further comprises an inner portion spaced from an outer portion, wherein at least a portion of the exterior surface portion of the end closure contacts the inner portion and at least a portion of an interior surface portion of the end closure contacts the outer portion.

13. The apparatus of claim 11, wherein the orientation head further comprises a body portion interconnected to the spoke, a face portion comprising a substantially planar surface orientated in a plane generally perpendicular to the body portion, and a pocket formed in a portion of the face portion, the pocket comprising a geometric profile adapted to receive a pull tab interconnected to the exterior surface portion of the end closure.

14. The apparatus of claim 11, wherein the orientation head engages the exterior surface of the end closure and rotates the end closure as the end closure travels between the first end and second end of the arcuate guide assembly.

15. The apparatus of claim 14, further comprising:
    a bevel gear operably engaged to the hub, the bevel gear comprising a face portion oriented substantially perpendicular to an axis of rotation of the hub, and teeth formed on a portion of an annulus of the face portion; and
    a pinion gear interconnected to the spoke, wherein teeth of the pinion gear engage the teeth formed on the bevel gear to rotate at least a portion of the spoke and the orientation head.

16. The apparatus of claim 11, wherein the apparatus is operable to rotate the end closure as the orientation head and the end closure move between the first end and second end of the arcuate guide assembly.

17. A method of orienting a metallic end closure, comprising:
- providing an orientor comprising:
  - an arcuate guide assembly including a first end, a second end, and a means for engaging and supporting an end closure;
  - a hub operable to rotate at a predetermined rate;
  - a plurality of spokes extending radially from the hub; and
  - an orientation head interconnected to the distal end of each spoke, the orientation head having a face portion adapted to engage an exterior surface portion of an end closure, wherein each of the plurality of spokes are adapted to move the face portion of the orientation head interconnected thereto from the first end to the second end of the arcuate guide assembly;
- receiving an end closure at the first end of the arcuate guide assembly, wherein a pull tab interconnected to the exterior surface portion of the end closure is positioned proximate to a face portion of one of the orientation heads;
- rotating the hub, wherein the face portion of the orientation head engages the end closure and moves the end closure from the first end to the second end of the arcuate guide assembly; and
- rotating the end closure around a longitudinal axis of the spoke associated with the orientation head, wherein the end closure and the pull tab are aligned in a predetermined orientation when the end closure exits the second end of the arcuate guide assembly.

18. The method of claim 17, wherein the orientor further comprises:
- a bevel gear interconnected to the hub, the bevel gear comprising a predetermined number of teeth formed on a portion of the bevel gear; and
- a pinion gear interconnected to each of the plurality of spokes, wherein when the hub rotates, the teeth of the pinion gears engage the teeth of the bevel gear and at least a portion of each spoke and the orientation head interconnected thereto rotates.

19. The method of claim 17, wherein the spoke is biased in a radially extended position, and wherein the face portion of the orientation head applies a force to the exterior surface portion of the end closure when the end closure is engaged to the face portion of the orientation head.

20. The method of claim 17, further comprising disengaging the orientation head from the end closure after the end closure is aligned in a predetermined orientation.

* * * * *